(12) United States Patent
Bernatz et al.

(10) Patent No.: US 8,999,459 B2
(45) Date of Patent: *Apr. 7, 2015

(54) LIQUID CRYSTAL DISPLAY

(75) Inventors: Georg Bernatz, Darmstadt (DE); Melanie Klasen-Memmer, Heuchelheim (DE); Matthias Bremer, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 623 days.

This patent is subject to a terminal disclaimer.

(21) Appl. No.: 12/675,478

(22) PCT Filed: Jul. 30, 2008

(86) PCT No.: PCT/EP2008/006267
§ 371 (c)(1), (2), (4) Date: Feb. 26, 2010

(87) PCT Pub. No.: WO2009/030318
PCT Pub. Date: Mar. 12, 2009

(65) Prior Publication Data
US 2010/0304049 A1 Dec. 2, 2010

(30) Foreign Application Priority Data
Aug. 29, 2007 (DE) .......... 10 2007 040 716

(51) Int. Cl.
| C09K 19/00 | (2006.01) |
| C09K 19/02 | (2006.01) |
| G02F 1/1333 | (2006.01) |
| C09K 19/30 | (2006.01) |
| C09K 19/12 | (2006.01) |
| C09K 19/52 | (2006.01) |
| C09K 19/06 | (2006.01) |
| C09K 19/42 | (2006.01) |
| C09K 19/04 | (2006.01) |
| C09K 19/54 | (2006.01) |

(52) U.S. Cl.
CPC ............. *C09K 19/3003* (2013.01); *C09K 19/42* (2013.01); *C09K 2019/0444* (2013.01); *C09K 2019/0448* (2013.01); *C09K 2019/0451* (2013.01); *C09K 2019/3004* (2013.01); *C09K 2019/3009* (2013.01); *C09K 2019/301* (2013.01); *C09K 2019/3016* (2013.01); *C09K 2019/548* (2013.01)

(58) Field of Classification Search
USPC .............. 252/299.01, 299.6–299.66; 428/1.1, 428/1.2; 430/20; 349/1, 56, 86, 182
See application file for complete search history.

(56) References Cited

U.S. PATENT DOCUMENTS

| 4,130,502 A | 12/1978 | Eidenschink et al. |
| 4,622,164 A | 11/1986 | Eidenschink et al. |
| 5,976,407 A | 11/1999 | Tarumi et al. |
| 6,126,857 A | 10/2000 | Reiffenrath et al. |
| 6,174,572 B1 | 1/2001 | Hirschmann et al. |
| 6,419,999 B1 | 7/2002 | Tarumi et al. |
| 6,497,828 B1 | 12/2002 | Hirschmann et al. |
| 6,861,107 B2 | 3/2005 | Klasen-Memmer et al. |
| 6,890,606 B2 | 5/2005 | Hirschmann et al. |
| 7,731,865 B2 * | 6/2010 | Bernatz et al. ........... 252/299.01 |
| 2001/0045545 A1 | 11/2001 | Tarumi et al. |
| 2003/0136945 A1 | 7/2003 | Hirschmann et al. |
| 2004/0011996 A1 | 1/2004 | Klasen-Memmer et al. |
| 2005/0006624 A1 | 1/2005 | Kato |
| 2005/0116200 A1 | 6/2005 | Nakanishi et al. |
| 2006/0278849 A1 * | 12/2006 | Suzuki et al. ............ 252/299.61 |
| 2008/0090026 A1 | 4/2008 | Bernatz et al. |
| 2009/0324853 A1 * | 12/2009 | Bernatz et al. ................. 428/1.1 |

FOREIGN PATENT DOCUMENTS

| DE | 26 36 684 A1 | 2/1978 |
| DE | 33 21 373 A1 | 12/1984 |
| DE | 44 26 799 | 2/1995 |
| DE | 197 07 807 | 9/1998 |
| DE | 198 32 789 | 5/1999 |
| DE | 199 43 649 | 6/2000 |
| DE | 101 57 674 A1 | 6/2002 |
| EP | 0 364 538 B | 5/1992 |
| EP | 0 834 491 A | 4/1998 |
| EP | 0 882 695 A | 12/1998 |
| EP | 1 026 142 A | 8/2000 |
| EP | 1 378 557 A | 1/2004 |
| EP | 1 477 546 A | 11/2004 |
| EP | 1 498 468 A | 1/2005 |
| EP | 1 889 894 A | 2/2008 |
| GB | 2 358 870 | 8/2001 |
| GB | 2 379 931 A | 3/2003 |
| JP | 07-053432 | 2/1995 |
| JP | 10-245559 | 9/1998 |
| JP | 11-131064 | 5/1999 |

(Continued)

OTHER PUBLICATIONS

"International Search Report," International Application No. PCT/EP2008/006267, Date of Completion Oct. 16, 2008, Date of Mailing Oct. 24, 2008, 4 pages.

Semiconductor Energy Lab—"Liquid Crystal Composition and Electrooptic Device", Patent Abstracts of Japan—Publication No. 2006-143895—Date of Publication: Jun. 8, 2006; machine translation.

Merck Patent GmbH, "Benzene Derivatives and Liquid-Crystalline Medium", Espacenet Bibliographic data: English Abstract of DE 44 26 799, dated Feb. 9, 1995.

(Continued)

*Primary Examiner* — Geraldina Visconti

(74) *Attorney, Agent, or Firm* — Millen, White, Zelano & Branigan, P.C.

(57) ABSTRACT

The present invention relates to a liquid-crystal (LC) display of the PSA (polymer sustained alignment) type, and to polymerizable compounds and LC media for use in PSA displays.

15 Claims, No Drawings

(56) References Cited

FOREIGN PATENT DOCUMENTS

| JP | 2000-096059 | 4/2000 |
| JP | 2004131704 A | 4/2004 |
| JP | 2006-143895 | 6/2006 |
| JP | 2006143895 A | 6/2006 |
| TW | 200833822 A | 8/2008 |

OTHER PUBLICATIONS

Merck Patent GmbH, "Benzene Derivative and Liquid Crystal Medium", machine translation of JP 07-053432 dated Feb. 28, 1995.
English Translation Abstract of JP2006143895A dated Jun. 8, 2006.
Official Action related to corresponding Taiwanese Patent Application No. No. 097133353 dated May 8, 2014.

* cited by examiner

LIQUID CRYSTAL DISPLAY

The present invention relates to liquid-crystal (LC) displays of the PS (polymer stabilised) or PSA (polymer sustained alignment) type, and to novel polymerisable compounds and novel LC media for use in PS(A) displays.

The liquid-crystal displays (LC displays) used at present are mostly those of the TN (twisted nematic) type. However, these have the disadvantage of a strong viewing-angle dependence of the contrast.

In addition, so-called VA (vertical alignment) displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the electrodes, a realignment of the LC molecules parallel to the electrode surfaces takes place.

Furthermore, OCB (optically compensated bend) displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are IPS (in-plane switching) displays, which contain an LC layer between two substrates, only one of which has an electrode layer, usually with a comb-shaped structure. On application of a voltage, an electric field which has a significant component parallel to the LC layer is thereby generated. This causes realignment of the LC molecules in the layer plane. Furthermore, so-called FFS (fringe field switching) displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of a structured (comb-shaped) electrode, and the other electrode is unstructured. A strong, so-called "fringe field" is thereby generated, i.e. a strong electric field close to the edge of the electrodes, and, throughout the cell, an electric field which has both a strong vertical component and a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations can exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are desired.

A further development are the so-called PSA (polymer sustained alignment) displays. In these, a small amount (for example 0.3% by weight, typically <1% by weight) of a polymerisable compound is added to the LC medium and, after introduction into the LC cell, is polymerised or crosslinked in situ, usually by UV photopolymerisation, with an electrical voltage applied between the electrodes. The addition of polymerisable mesogenic or liquid-crystalline compounds, also known as "reactive mesogens" (RMs), to the LC mixture has proven particularly suitable.

In the meantime, the PS or PSA principle is being used in diverse classical LC displays. Thus, for example, PSA-VA, PSA-OCB, PS-IPS and PS-TN displays are known. As can be demonstrated in test cells, the PSA method results in a pretilt in the cell. In the case of PSA-OCB displays, it is therefore possible for the bend structure to be stabilised so that an off-set voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays are described, for example, in JP 10-036847 A, EP 1 170 626 A2, EP 1 378 557 A1, EP 1 498 468 A1, US 2004/0191428 A1, US 2006/0066793 A1 and US 2006/0103804 A1. PSA-OCB displays are described, for example, in T.-J- Chen et al., Jpn. J. Appl. Phys. 45, 2006, 2702-2704 and S. H. Kim, L.-C- Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

In particular for monitor and especially TV applications, optimisation of the response times, but also of the contrast and luminance (i.e. also transmission) of the LC display, is still demanded. The PSA process still appears to provide crucial advantages here. In particular in the case of PSA-VA, a shortening of the response times, which correlate with a measurable pretilt in test cells, can be achieved without a significant adverse effects on other parameters.

However, it has been found that the LC mixtures and RMs known from the prior art still have some disadvantages on use in PS(A) displays. Thus, far from every desired soluble RM is suitable for PS(A) displays, and it often appears difficult to find more suitable selection criteria than just the direct PSA experiment with pretilt measurement. The choice becomes even smaller if polymerisation by means of UV light without the addition of photoinitiators is desired, which may be advantageous for certain applications.

In addition, the selected "material system" of LC mixture (also referred to below as "LC host mixture")+polymerisable component should have the best possible electrical properties, in particular the "voltage holding ratio" (HR or VHR). In connection with PSA-VA, a high HR after irradiation with (UV) light is, in particular, of central importance since this is an indispensible part of the process, but of course also occurs as "normal" stress in the finished display.

However, the problem arises that not every LC mixture+polymerisable component combination "functions" since, for example, an inadequate tilt or none at all is established or since, for example, the HR is inadequate for TFT display applications.

Thus, there continues to be a great demand for PS(A) displays, in particular of the VA and OCB type, and for LC media and polymerisable compounds for use in such displays, which do not have the disadvantages described above or only do so to a small extent and have improved properties. In particular, there is a great demand for PS(A) displays or materials having high specific resistance at the same time as a large working-temperature range, short response times, even at low temperatures, and a low threshold voltage, which facilitate a large number of grey shades, high contrast and a wide viewing angle, and have high values for the voltage holding ratio (HR) after UV exposure.

The invention was based on the object of providing PS(A) displays which do not have the disadvantages indicated above or only do so to a lesser extent, enable the setting of a pretilt angle and preferably at the same time have very high specific resistance values, low threshold voltages and short response times.

Surprisingly, it has now been found that this object can be achieved by using PS(A) displays according to the invention which contain an LC medium as described in the present invention. In particular, it has been found, surprisingly, that on use of LC mixtures comprising alkenyl compounds containing a non-terminal double bond, the polymerisation behaviour of the RMs is only influenced to a slight extent. Thus, on use of VA mixtures according to the invention (comprising alkenyl compounds containing a non-terminal double bond) in test cells, only a slightly reduced pretilt angle was observed compared with alkenyl-free mixtures, while in the case of VA mixtures comprising alkenyl compounds containing a terminal double bond, no pretilt was measurable. As mentioned above, however, a pretilt is desired in order to be able to achieve shorter response times. This has been demonstrated in connection with an LC medium according to the invention by means of pretilt measurements in VA tilt measurement cells. In particular, it was possible to achieve a pretilt without the addition of photoinitiator.

The invention thus relates to a liquid-crystal (LC) display of the PS (polymer stabilised) or PSA (polymer sustained alignment) type, containing an LC cell consisting of two substrates, where at least one substrate is transparent to light and at least one substrate has an electrode layer, and a layer of an LC medium comprising a polymerised component and a low-molecular-weight component located between the substrates, where the polymerised component is obtainable by polymerisation of one or more polymerisable compounds between the substrates of the LC cell in the LC medium with application of an electrical voltage, characterised in that the low-molecular-weight component comprises one or more compounds of the formula A

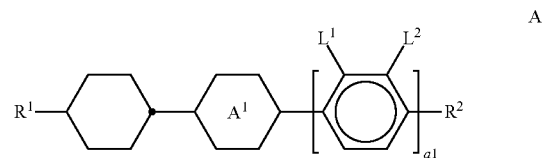

in which the individual radicals have the following meanings:

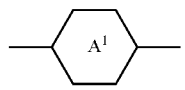

denotes

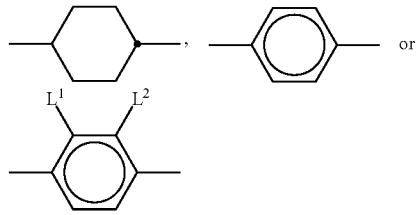

a1 denotes 0 or 1,
$L^1$ and $L^2$ each, independently of one another, denote H, F or Cl,
$R^1$ on each occurrence, identically or differently, denotes —$(CH_2)_m$—CH=CH—$C_nH_{2n+1}$,
$R^2$ denotes alkyl having 1 to 12 C atoms, in which, in addition, one or two non-adjacent $CH_2$ groups may be replaced by —O—, —CH=CH—, —CO—, —CO— or —COO— in such a way that O atoms are not linked directly to one another, or, if a1=0 and the ring $A^1$ denotes cyclohexylene, $R^2$ also denotes $R^1$,
m on each occurrence, identically or differently, denotes 0, 1, 2, 3, 4 or 5,
n on each occurrence, identically or differently, denotes 1, 2, 3, 4, 5 or 6, where n+m≤6.

The invention furthermore relates to an LC medium comprising one or more polymerisable compounds and one or more low-molecular-weight compounds as described above and below.

The invention furthermore relates to an LC medium comprising
a liquid-crystalline component A), also referred to as "LC host mixture" below, comprising one or more, preferably two or more, low-molecular-weight (i.e. monomeric or unpolymerised) compounds, at least one of which is selected from formula A,
and
a polymerisable component B) comprising one or more polymerisable compounds as described above and below.

The invention furthermore relates to the use of compounds of the formula A in PS and PSA displays.

The invention furthermore relates to an LC display containing one or more compounds of the formula A or an LC medium according to the invention, in particular a PS or PSA display, particularly preferably a PSA-VA, PSA-OCB, PS-IPS, PS-FFS or PS-TN display.

Particular preference is given to compounds of the formula A in which m is 0. Preference is furthermore given to compounds of the formula A in which n is 1, 2 or 3.

$R^1$ is preferably $CH_3—CH=CH—$, $CH_3—CH_2—CH=CH—$, $CH_3—(CH_2)_2—CH=CH—$, $CH_3—(CH_2)_3—CH=CH—$ or $CH_3—CH=CH—(CH_2)_2—$.

$R^2$ is preferably straight-chain alkyl or alkoxy having 1 to 8 C atoms, particularly preferably methoxy, ethoxy, n-propoxy or n-butoxy, or has one of the meanings indicated for $R^1$.

Further preferred compounds of the formula A are those in which $L^1$ and $L^2$ denote F, those in which $L^1$ and $L^2$ denote H, and those in which $L^1$ denotes Cl and $L^2$ denotes F or $L^1$ denotes F and $L^2$ denotes Cl.

The compounds of the formula A are preferably selected from the following formulae:

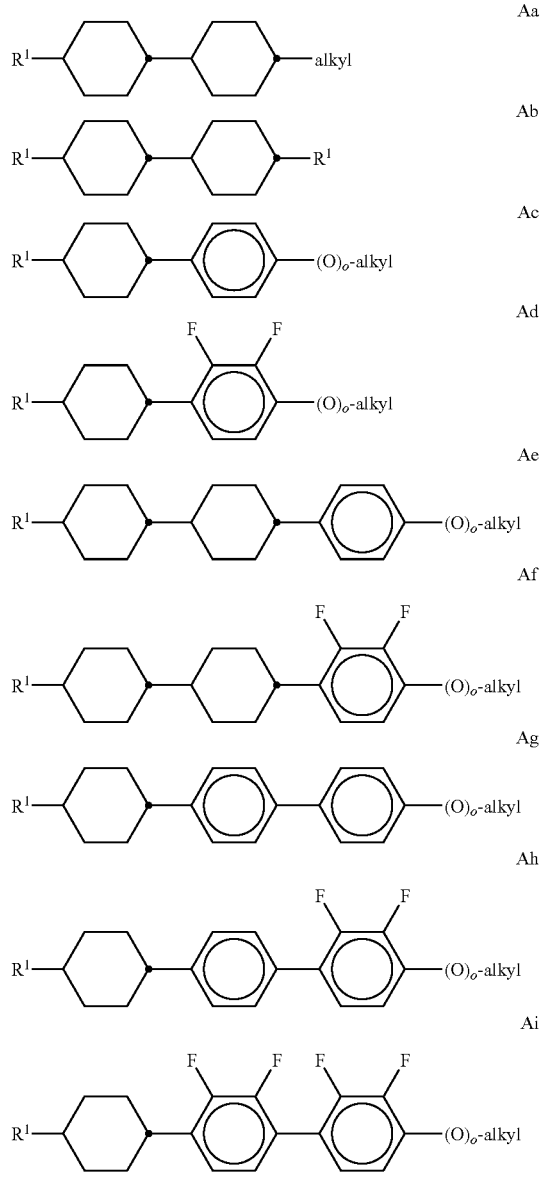

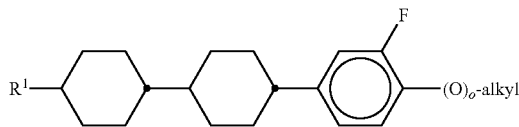

in which $R^1$ on each occurrence, identically or differently, has the above-mentioned meaning, o is 0 or 1, and "alkyl" denotes $C_{1-6}$-alkyl, which is preferably straight-chain. Particular preference is given to compounds of the formulae Aa, Ab, Ad, Ae, Af, Ah.

Particular preference is given to LC media in which component A) is an LC compound or an LC mixture which has a nematic liquid-crystal phase.

Preference is furthermore given to LC media comprising one, two or three polymerisable compounds as described above and below.

Preference is furthermore given to achiral polymerisable compounds and LC media comprising, preferably consisting exclusively of, achiral compounds.

Preference is furthermore given to PS(A) displays and LC media in which the polymerisable component or component B) comprises one or more polymerisable compounds containing a polymerisable group (monoreactive) and one or more polymerisable compounds containing two or more, preferably two, polymerisable groups (di- or multireactive).

Preference is furthermore given to PS(A) displays and LC media in which the polymerisable component or component B) consists exclusively of polymerisable compounds containing two polymerisable groups (direactive).

The polymerisable compounds can be added individually to the LC media, but it is also possible to use mixtures comprising two or more polymerisable compounds according to the invention. Copolymers are formed on polymerisation of such mixtures. The invention furthermore relates to the polymerisable mixtures mentioned above and below. The polymerisable compounds are mesogenic or non-mesogenic, preferably mesogenic or liquid-crystalline.

In a preferred embodiment of the invention, the polymerisable compounds are selected from formula I $$R^a\text{-}A^1\text{-}(Z^1\text{-}A^2)_{m1}\text{-}R^b \quad\quad\quad \text{I}$$

in which the individual radicals have the following meanings:

$R^a$ and $R^b$ each, independently of one another, denote P-Sp-, H, halogen, $SF_5$, $NO_2$, a carbon group or hydrocarbon group, where at least one of the radicals $R^a$ and $R^b$ denotes P-Sp-, P on each occurrence, identically or differently, denotes a polymerisable group, Sp on each occurrence, identically or differently, denotes a spacer group or a single bond, $A^1$ and $A^2$ each, independently of one another, denote an aromatic, heteroaromatic, alicyclic or heterocyclic group, preferably having 4 to 25 C atoms, which may also contain fused rings, and which is optionally mono- or polysubstituted by L, $Z^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR⁰R⁰⁰ or a single bond, L denotes P-Sp-, H, OH, CH₂OH, halogen, SF₅, NO₂, a carbon group or hydrocarbon group, R⁰ and R⁰⁰ each, independently of one another, denote H or alkyl having 1 to 12 C atoms, m1 denotes 0, 1, 2, 3 or 4, n1 denotes 1, 2, 3 or 4.

Particularly preferred compounds of the formula I are those in which

A¹ and A² each, independently of one another, denote 1,4-phenylene, naphthalene-1,4-diyl or naphthalene-2,6-diyl, in which, in addition, one or more CH groups in these groups may be replaced by N, cyclohexane-1,4-diyl, in which, in addition, one or more non-adjacent CH₂ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P-Sp-, OH, CH₂OH, F, Cl, Br, I, —CN, —NO₂, —NCO, —NCS, —OCN, —SCN, —C(=O)N(Rˣ)₂, —C(=O)Y¹, —C(=O)Rˣ, —N(Rˣ)₂, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl or P-Sp-, Y¹ denotes halogen, Rˣ denotes P-Sp-, H, halogen, straight-chain, branched or cyclic alkyl having 1 to 25 C atoms, in which, in addition, one or more non-adjacent CH₂ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl or P-Sp-, an optionally substituted aryl or aryloxy group having 6 to 40 C atoms, or an optionally substituted heteroaryl or heteroaryloxy group having 2 to 40 C atoms, Rᵃ and Rᵇ each, independently of one another, denote P-Sp-, H, L as defined above, or straight-chain or branched alkyl having 1 to 25 C atoms, in which, in addition, one or more non-adjacent CH₂ groups may each be replaced, independently of one another, by —C(Rˣ)=C(Rˣ)—, —C≡C—, —N(Rˣ)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN or P-Sp-, where at least one of the radicals Rᵃ, Rᵇ and L contains at least one group P-Sp-.

Particular preference is given to compounds of the formula I in which one or both radicals Rᵃ and Rᵇ denote P-Sp-.

Particularly preferred compounds of the formula I are selected from the following sub-formulae:

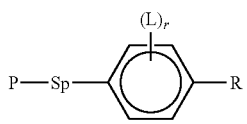

I1

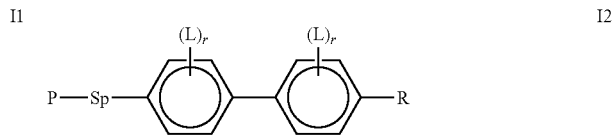

I2

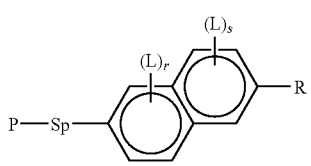

I3

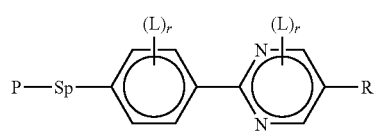

I4

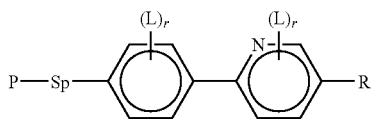

I5

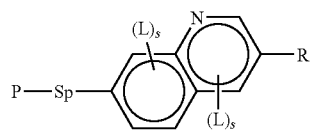

I6

I7

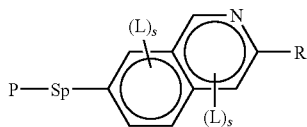

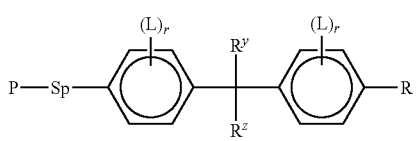

I8

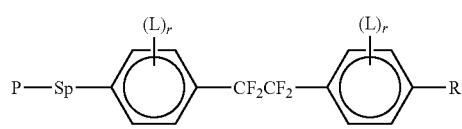

I9

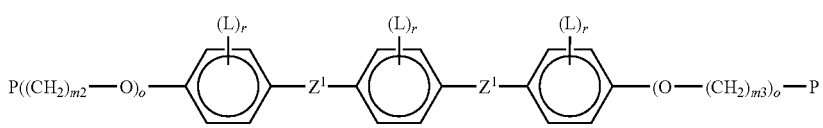

in which P, Sp, L, $Z^1$ and o on each occurrence, identically or differently, have one of the above-mentioned meanings, R has one of the meanings indicated for $R^x$ and preferably denotes P-Sp- or straight-chain or branched alkyl or alkoxy having 1 to 12 C atoms, m2 and m3 each, independently of one another, denote an integer from 1 to 8, r denotes 0, 1, 2, 3 or 4, s denotes 0, 1, 2 or 3, $R^y$ and $R^z$ each, independently of one another, denote H or $CH_3$, L preferably denotes F or $CH_3$, $Z^1$ preferably denotes —COO—, —OCO— or a single bond.

In a further preferred embodiment of the invention, the polymerisable compounds are chiral compounds selected from formula II:

$$(R^*-(A^1-Z^1)_{m1})_k-Q \qquad \text{II}$$

in which $A^1$, $Z^1$ and m1 have on each occurrence, identically or differently, one of the meanings indicated in formula I, R* on each occurrence, identically or differently, has one of the meanings indicated for $R^a$ in formula I, Q denotes a k-valent chiral group, which is optionally mono- or polysubstituted by L, k is 1, 2, 3, 4, 5 or 6, where the compounds contain at least one radical R* or L which denotes or contains a group P-Sp- as defined above.

Particularly preferred compounds of the formula II contain a monovalent group Q of the formula III

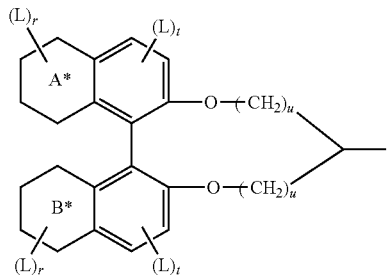

in which L and r have on each occurrence, identically or differently, the meanings indicated above, A* and B* each, independently of one another, denote fused benzene, cyclohexane or cyclohexene, t on each occurrence, identically or differently, denotes 0, 1 or 2, and u on each occurrence, identically or differently, denotes 0, 1 or 2.

Particular preference is given to groups of the formula III in which x denotes 1 or 2.

Further preferred compounds of the formula II contain a monovalent group Q or one or more groups R* of the formula IV

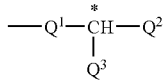

in which $Q^1$ denotes alkylene or alkyleneoxy having 1 to 9 C atoms or a single bond, $Q^2$ denotes optionally fluorinated alkyl or alkoxy having 1 to 10 C atoms, in which, in addition, one or two non-adjacent $CH_2$ groups may be replaced by —O—, —S—, —CH=CH—, —CO—, —OCO—, —COO—, —O—COO—, —S—CO—, —CO—S— or —C≡C— in such a way that O and/or S atoms are not linked directly to one another, $Q^3$ denotes F, Cl, CN or alkyl or alkoxy as defined for $Q^2$, but different from $Q^2$.

Preferred groups of the formula IV are, for example, 2-butyl (=1-methyl-propyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxa-pentyl, 2-methyl-3-oxa-hexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoro-methyloctyloxy.

Further preferred compounds of the formula II contain a divalent group Q of the formula V

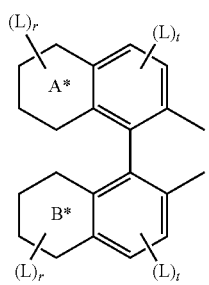

in which L, r, t, A* and B* have the meanings indicated above.

Further preferred compounds of the formula II contain a divalent group Q selected from the following formulae:

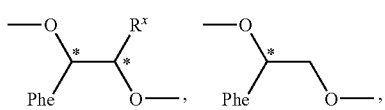
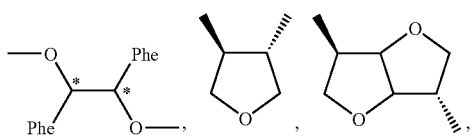
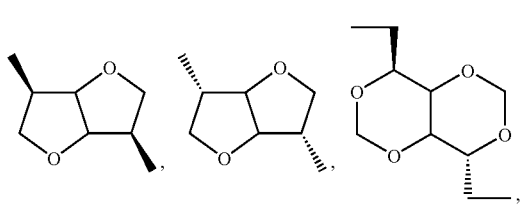
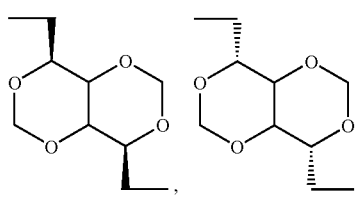
in which Phe denotes phenyl, which is optionally mono- or polysubstituted by L, and $R^x$ denotes F or optionally fluorinated alkyl having 1 to 4 C atoms.
Particularly preferred compounds of the formula II are selected from the following sub-formulae:
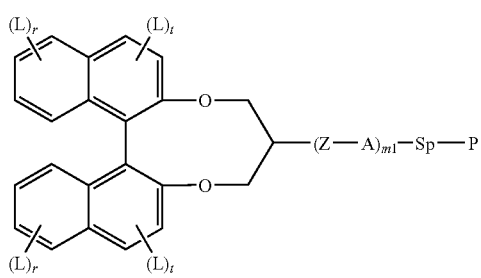
II1
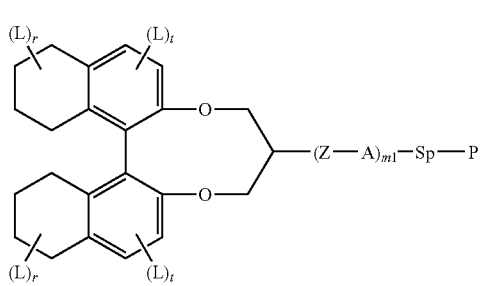
II2
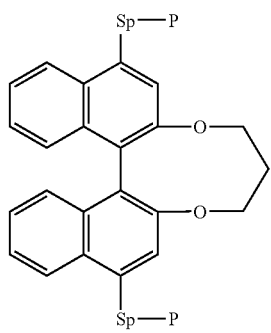
II3
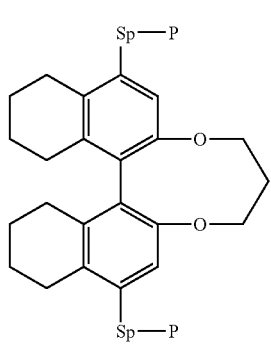
II4
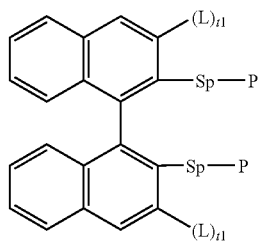
II5
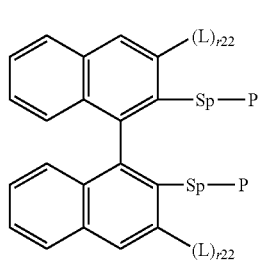
II6
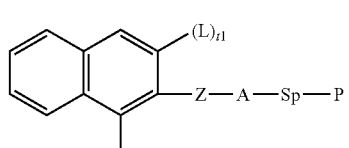
II7
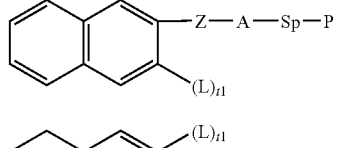
II8

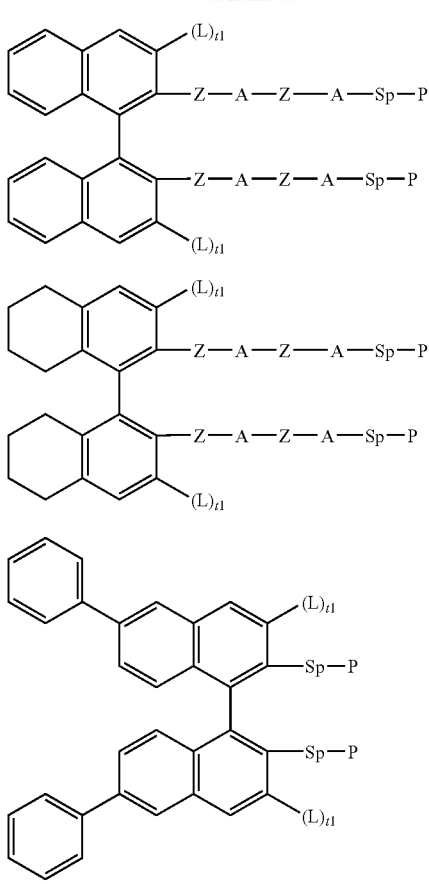

in which L, P, Sp, m1, r and t have the meanings indicated above, Z and A have on each occurrence, identically or differently, one of the meanings indicated for $Z^1$ and $A^1$ respectively, and t1 on each occurrence, identically or differently, denotes 0 or 1.

Above and below, the following meanings apply:

Unless indicated otherwise, the term "PSA" is used to represent PS displays and PSA displays.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound ("RM").

The term "reactive mesogen" or "RM" denotes a compound containing a mesogenic group and one or more functional groups which are suitable for polymerisation (also known as polymerisable group or group P).

The terms "low-molecular-weight compound" and "unpolymerisable compound" denote compounds, usually monomeric, which do not contain any functional group which is suitable for polymerisation under the usual conditions known to the person skilled in the art, in particular under the conditions used for the polymerisation of the RMs.

The term "organic group" denotes a carbon or hydrocarbon group.

The term "carbon group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also have spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" in accordance with the above definition containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those which contain exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, in which R$^x$ has the above-mentioned meaning, and Y$^1$ denotes halogen, optionally substituted silyl or aryl having 6 to 40, preferably 6 to 20 C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, R$^0$, —OR$^0$, —CO—R$^0$, —CO—O—R$^0$, —O—CO—R$^0$ or —O—CO—O—R$^0$, in which R$^0$ has the above-mentioned meaning.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

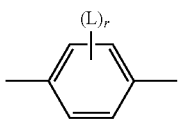

is preferably

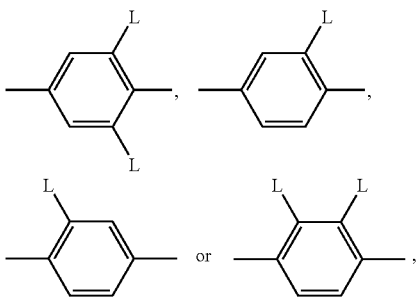

in which L has one of the above-mentioned meanings.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or C≡C triple bond, and groups which are suitable for polymerisation with ring opening, such as, for example, oxetane or epoxide groups.

Preferred polymerisable groups are selected from $CH_2=CW^1—COO—$, $CH_2=CW^1—CO—$,

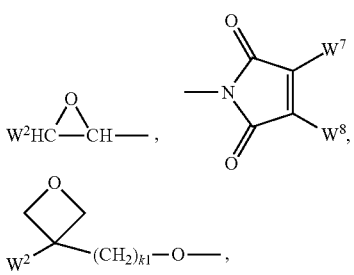

$CH_2=CW^2—(O)_{k3}—$, $CW^1=CH—CO—(O)_{k3}—$, $CW^1=CH—CO—NH—$, $CH_2=CW^1—CO—NH—$, $CH_3—CH=CH—O—$, $(CH_2=CH)_2CH—OCO—$, $(CH_2=CH—CH_2)_2CH—OCO—$, $(CH_2=CH)_2CH—O—$, $(CH_2=CH—CH_2)_2N—$, $(CH_2=CH—CH_2)_2N—CO—$, $HO—CW^2W^3—$, $HS—CW^2W^3—$, $HW^2N—$, $HO—CW^2W^3—NH—$, $CH_2=CW^1—CO—NH—$, $CH_2=CH—(COO)_{k1}$-Phe-$(O)_{k2}—$, $CH_2=CH—(CO)_{k1}$-Phe-$(O)_{k2}—$, Phe-CH=CH—, HOOC—, OCN— and $W^4W^5W^6Si—$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above, and $k_1$, $k_2$ and $k_3$ each, independently of one another, denote 0 or 1, $k_3$ preferably denotes 1.

Particularly preferred groups P are $CH_2=CH—COO—$, $CH_2=C(CH_3)—COO—$, $CH_2=CF—COO—$, $CH_2=CH—$, $CH_2=CH—O—$, $(CH_2=CH)_2CH—OCO—$, $(CH_2=CH)_2CH—O—$,

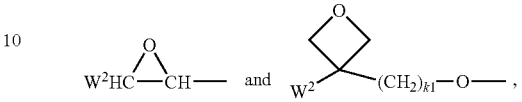

particular vinyloxy, acrylate, methacrylate, fluoroacrylate, chloroacrylate, oxetane and epoxide.

In a further preferred embodiment of the invention, the polymerisable compounds of the formula I and sub-formulae thereof contain, instead of one or more radicals —P-Sp-, one or more branched radicals containing two or more polymerisable groups P (multifunctional polymerisable radicals). Suitable radicals of this type, and polymerisable compounds containing them, are described, for example, in U.S. Pat. No. 7,060,200 B1 or US 2006/0172090 A1. Particular preference is given to multifunctional polymerisable radicals selected from the following formulae:

| | |
|---|---|
| —X-alkyl-$CHP^1$—$CH_2$—$CH_2P^2$ | I*a |
| —X-alkyl-$C(CH_2P^1)(CH_2P^2)$—$CH_2P^3$ | I*b |
| —X-alkyl-$CHP^1CHP^2$—$CH_2P^3$ | I*c |
| —X-alkyl-$C(CH_2P^1)(CH_2P^2)$—$C_{aa}H_{2aa+1}$ | I*d |
| —X-alkyl-$CHP^1$—$CH_2P^2$ | I*e |
| —X-alkyl-$CHP^1P^2$ | I*f |
| —X-alkyl-$CP^1P^2$—$C_{aa}H_{2aa+1}$ | I*g |
| —X-alkyl-$C(CH_2P^1)(CH_2P^2)$—$CH_2OCH_2$—C$(CH_2P^3)(CH_2P^4)CH_2P^5$ | I*h |
| —X-alkyl-$CH((CH_2)_{aa}P^1)((CH_2)_{bb}P^2)$ | I*i |
| —X-alkyl-$CHP^1CHP^2$—$C_{aa}H_{2aa+1}$ | I*k | in which alkyl denotes a single bond or straight-chain or branched alkylene having 1 to 12 C atoms, in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where $R^x$ has the above-mentioned meaning and preferably denotes $R^0$ as defined above, aa and bb each, independently of one another, denote 0, 1, 2, 3, 4, 5 or 6, X has one of the meanings indicated for X', and $P^{1-5}$ each, independently of one another, have one of the meanings indicated above for P.

Preferred spacer groups Sp are selected from the formula Sp'-X', so that the radical "P-Sp-" conforms to the formula "P-Sp'-X'—", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^0$—, —$SiR^0R^{00}$—, —CO—, —CO—O—, —OCO—, —OCO—O—, —S—CO—, —CO—S—, —$NR^0$—CO—O—, —O—CO—$NR^0$—, —$NR^0$—CO—$NR^0$—, —CH=CH— or —C≡C— in such a way that O and/or S atoms are not linked directly to one another, X' denotes —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—COO—, —OCO—CH=CH— or a single bond, $R^0$ and $R^{00}$ each, independently of one another, denote H or alkyl having 1 to 12 C atoms, and $Y^2$ and $Y^3$ each, independently of one another, denote H, F, Cl or CN.

X' is preferably —O—, —S—, —CO—, —COO—, —OCO—, —O—COO—, —CO—$NR^0$—, —$NR^0$—CO—, —$NR^0$—CO—$NR^0$— or a single bond.

Typical spacer groups Sp' are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —($SiR^0R^{00}$—O$)_{p1}$—, in which p1 is an integer from 1 to 12, q1 is an integer from 1 to 3, and $R^0$ and $R^{00}$ have the above-mentioned meanings.

Particularly preferred groups —X'-Sp'- are —$(CH_2)_{p1}$—, —O—$(CH_2)_{p1}$—, —OCO—$(CH_2)_{p1}$—, —OCOO—$(CH_2)_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

The polymerisable compounds are prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. The synthesis of polymerisable acrylates and methacrylates of the formula I can be carried out analogously to the methods described in U.S. Pat. No. 5,723,066. Further, particularly preferred methods are given in the examples.

In the simplest case, the synthesis is carried out by esterification or etherification of commercially available diols of the general formula HO-$A^1$-($Z^1$-$A^2$)$_{m1}$-OH, in which $A^1$, $A^2$, $Z^1$ and m have the above-mentioned meanings, such as, for example, 2,6-dihydroxynaphthalene (naphthalene-2,6-diol), or 1-(4-hydroxyphenyl)phenyl-4-ol, using corresponding acids, acid derivatives, or halogenated compounds containing a group P, such as, for example, methacryloyl chloride or methacrylic acid, in the presence of a dehydrating reagent, such as, for example, DCC (dicyclohexylcarbodiimide).

The polymerisable compounds are polymerised or crosslinked (if a compound contains two or more polymerisable groups) by in-situ polymerisation in the LC medium between the substrates of the LC display with application of a voltage. Suitable and preferred polymerisation methods are, for example, thermal or photopolymerisation, preferably photopolymerisation, in particular UV photopolymerisation.

If necessary, one or more initiators may also be added here. Suitable conditions for the polymerisation, and suitable types and amounts of initiators, are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion in the mixture as a whole is preferably 0.001 to 5% by weight, particularly preferably 0.001 to 1% by weight. However, the polymerisation can also take place without addition of an initiator. In a further preferred embodiment, the LC medium does not comprise a polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers of the Irganox® series (Ciba AG). If stabilisers are employed, their proportion, based on the total amount of RMs or polymerisable component A), is preferably 10-5000 ppm, particularly preferably 50-500 ppm.

The polymerisable compounds according to the invention are also suitable for polymerisation without initiator, which is associated with considerable advantages, such as, for example, lower material costs and in particular less contamination of the LC medium by possible residual amounts of the initiator or degradation products thereof.

The LC media according to the invention preferably comprise <5%, particularly preferably <1%, very particularly preferably <0.5%, of polymerisable compounds, in particular polymerisable compounds of the above-mentioned formulae.

The polymerisable compounds according to the invention can be added individually to the LC media, but it is also possible to use mixtures comprising two or more polymerisable compounds. On polymerisation of mixtures of this type, copolymers are formed. The invention furthermore relates to the polymerisable mixtures mentioned above and below.

Besides the polymerisable compounds described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive to a polymerisation reaction under the conditions used for the polymerisation of the polymerisable compounds. In principle, any LC mixture which is suitable for use in conventional VA and OCB displays is suitable as host mixture. Suitable LC mixtures are known to the person skilled in the art and are described in the literature, for example mixtures in VA displays are described in EP 1 378 557 A1 and mixtures for OCB displays are described in EP 1 306 418 A1 and DE 102 24 046 A1.

Particularly preferred host mixtures and LC media are indicated below:

a) LC medium which comprises one or more compounds selected from the following formulae:

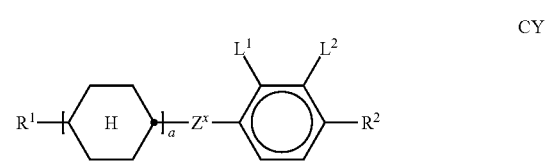

CY

-continued

PY

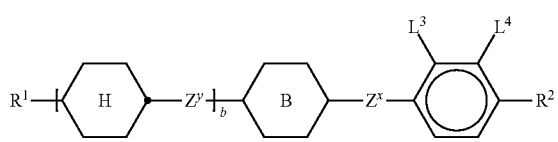

in which the individual radicals have the following meanings:

a denotes 1 or 2, b denotes 0 or 1,

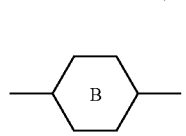

denotes

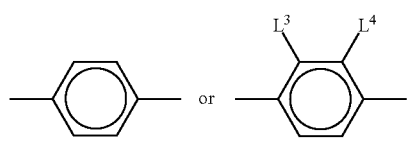

R¹ and R² each, independently of one another, denote alkyl having 1 to 12 C atoms, in which, in addition, one or two non-adjacent CH₂ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —CH₂CH₂—, —CH=CH—, —CF₂O—, —OCF₂—, —CH₂O—, —OCH₂—, —COO—, —OCO—, —C₂F₄—, —CF=CF—, —CH=CHCH₂O— or a single bond, preferably a single bond, $L^{1-4}$ each, independently of one another, denote F, Cl, OCF₃, CF₃, CH₃, CH₂F, CHF₂.

Preferably, both radicals L¹ and L² denote F, or one of the radicals L¹ and L² denotes F and the other denotes Cl, or both radicals L³ and L⁴ denote F, or one of the radicals L³ and L⁴ denotes F and the other denotes Cl.

The compounds of the formula CY are preferably selected from the following sub-formulae:

CY1

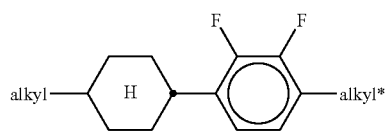

CY2

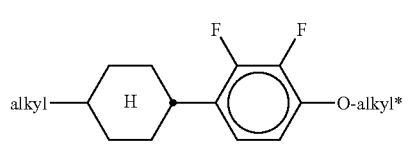

-continued

CY3

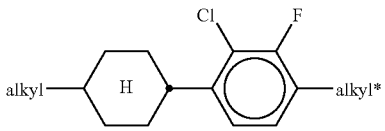

CY4

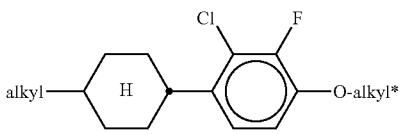

CY5

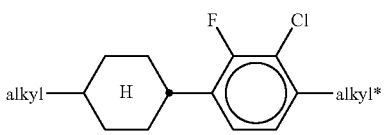

CY6

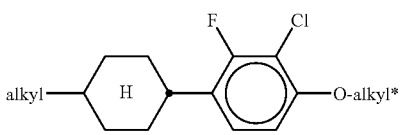

CY9

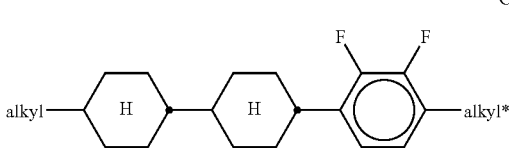

CY10

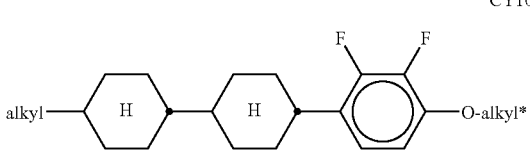

CY11

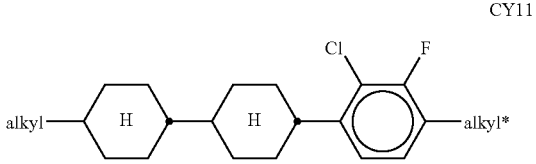

CY12

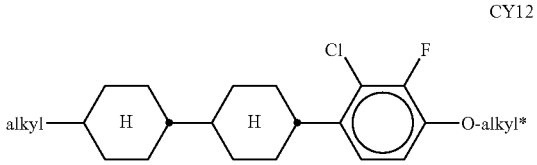

CY13

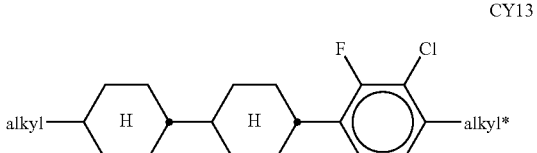

CY14

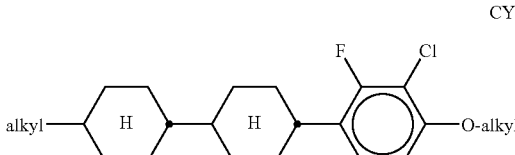

CY17

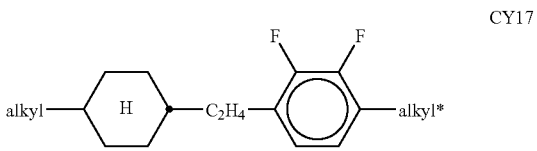

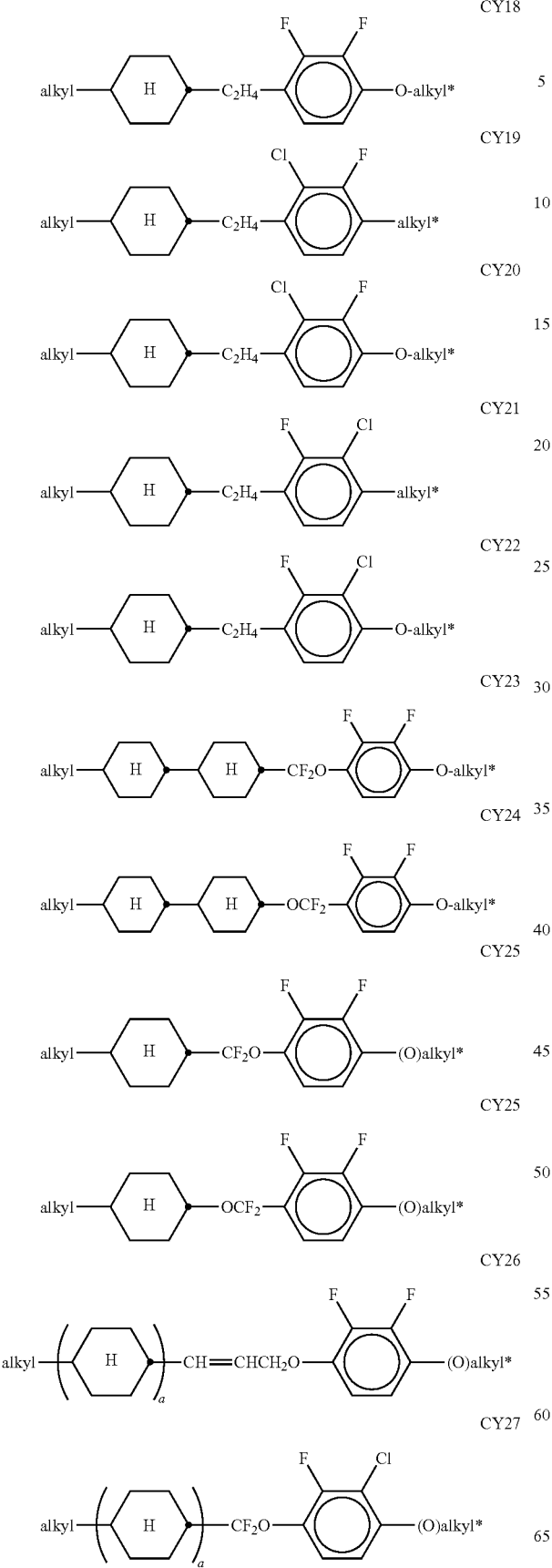
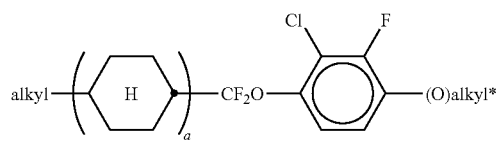
in which a denotes 1 or 2, and alkyl and alkyl* each, independently of one another, denote a straight-chain alkyl radical having 1-6 C atoms.
The compounds of the formula PY are preferably selected from the following sub-formulae:
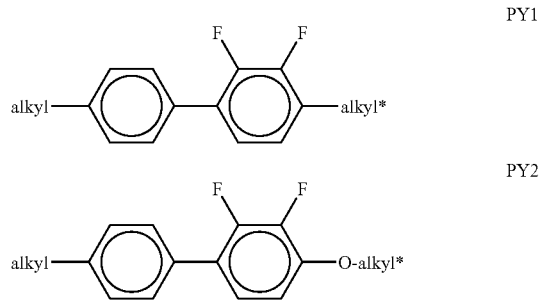
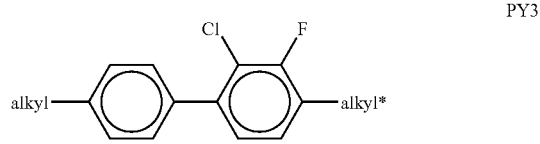
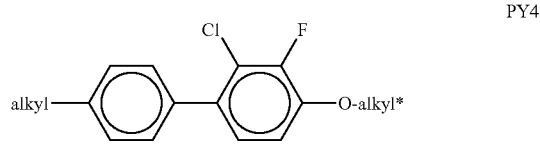
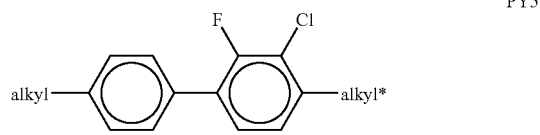
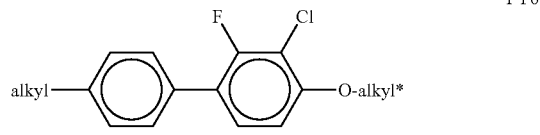
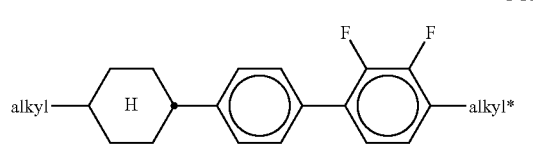
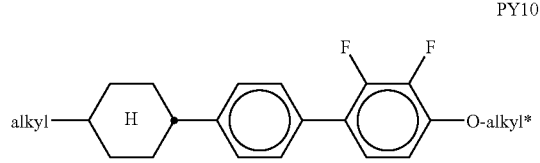

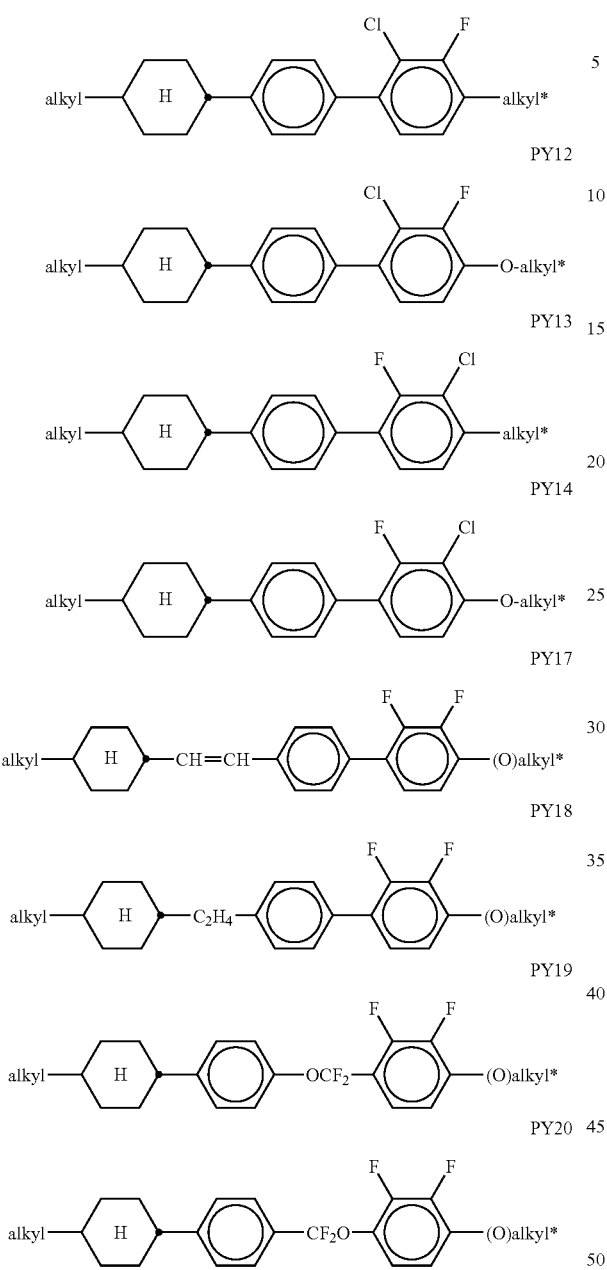

in which alkyl and alkyl* each, independently of one another, denote a straight-chain alkyl radical having 1-6 C atoms.

b) LC medium which additionally comprises one or more compounds of the following formula:

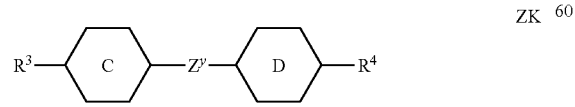

in which the individual radicals have the following meanings:

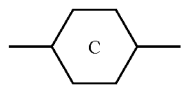

denotes

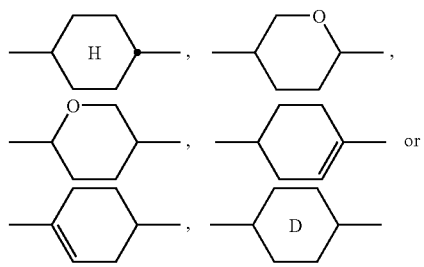

denotes

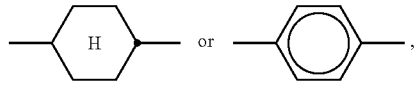

$R^3$ and $R^4$ each, independently of one another, denote alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —$CH=CHCH_2O$— or a single bond, preferably a single bond.

The compounds of the formula ZK are preferably selected from the following sub-formulae:

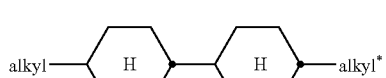

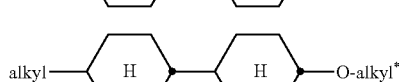

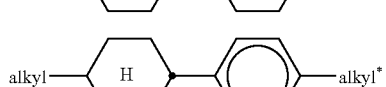

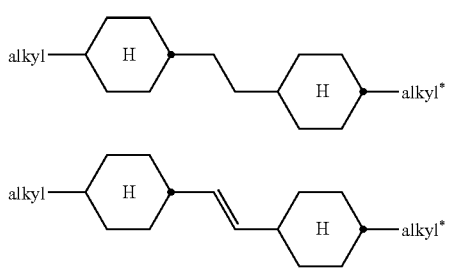

ZK9

ZK10 in which alkyl and alkyl* each, independently of one another, denote a straight-chain alkyl radical having 1-6 C atoms.

c) LC medium which additionally comprises one or more compounds of the following formula:

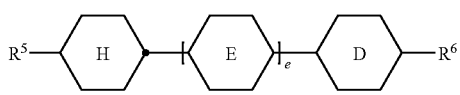

DK in which the individual radicals have on each occurrence, identically or differently, the following meanings:

$R^5$ and $R^6$ each, independently of one another, have one of the meanings indicated above for $R^1$,

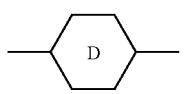

denotes

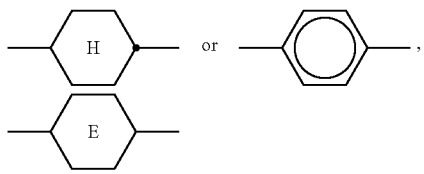

denotes

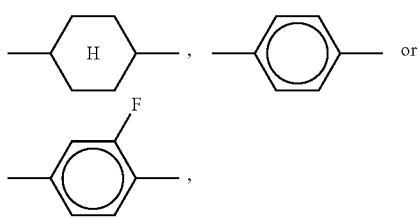

and e denotes 1 or 2.

The compounds of the formula DK are preferably selected from the following sub-formulae:

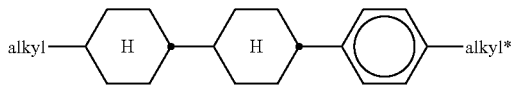

DK1

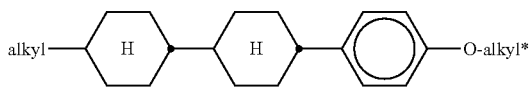

DK2

DK4

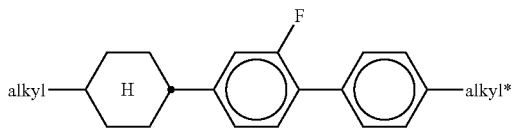

DK6

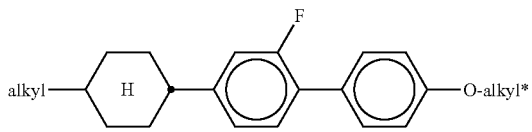

DK7

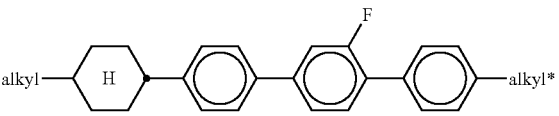

DK8

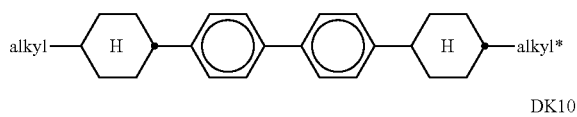

DK9

DK10 in which alkyl and alkyl* each, independently of one another, denote a straight-chain alkyl radical having 1-6 C atoms.

d) LC medium which additionally comprises one or more compounds of the following formula:

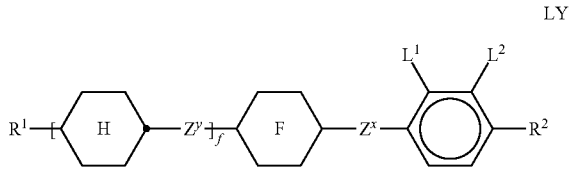

LY in which the individual radicals have the following meanings:

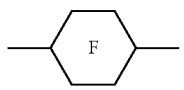

denotes

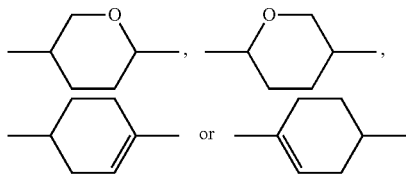

f denotes 0 or 1,

R$^1$ and R$^2$ each, independently of one another, denote alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, Z$^x$ and Z$^y$ each, independently of one another, denote —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O— or a single bond, preferably a single bond, L$^1$ and L$^2$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl.

The compounds of the formula LY are preferably selected from the following sub-formulae:

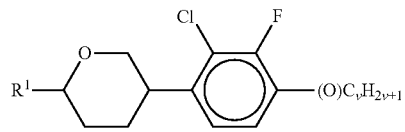

LY1

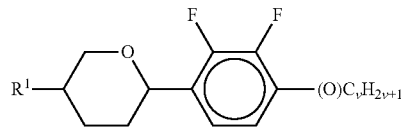

LY2

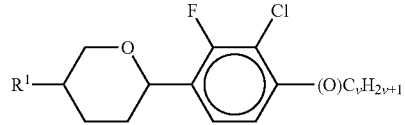

LY3

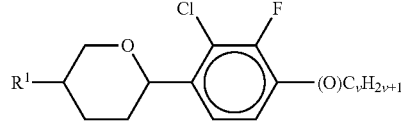

LY4

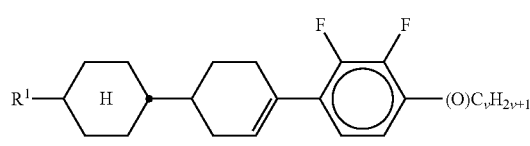

LY5

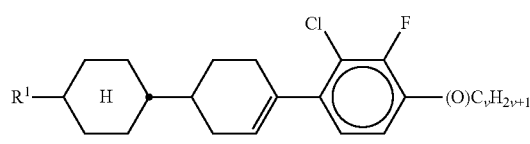

LY6

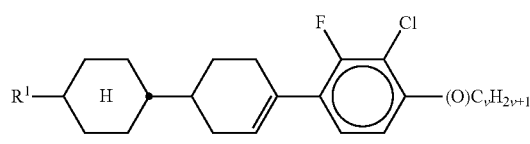

LY7

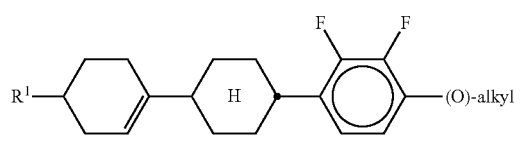

LY8

LY9

LY10

LY11

LY12

LY13

LY14

LY15

LY16

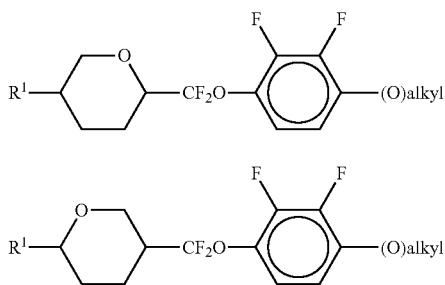

LY17

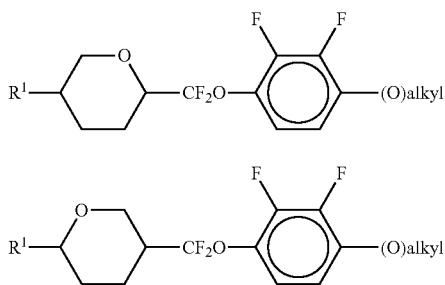

LY18 in which R¹ has the above-mentioned meaning, and v denotes an integer from 1 to 6. R¹ preferably denotes straight-chain alkyl, in particular $CH_3$, $C_2H_5$, n-$C_3H_7$, n-$C_4H_9$, n-$C_5H_{11}$.

e) LC medium which additionally comprises one or more compounds selected from the following formulae:

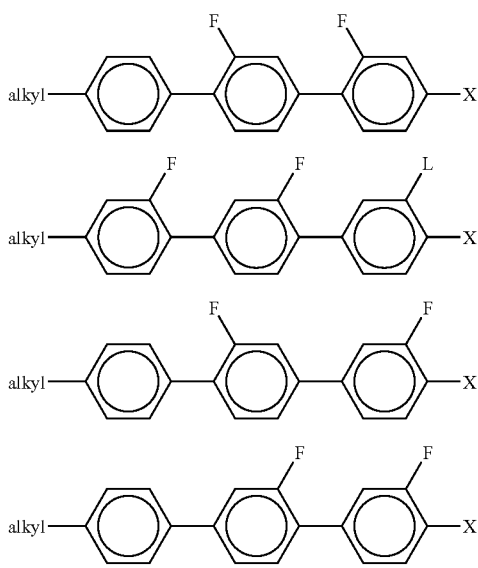

G1

G2

G3

G4 in which alkyl denotes $C_{1-6}$-alkyl, L denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the following formulae:

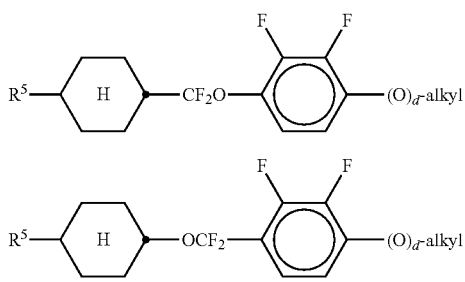

Y1

Y2

Y3

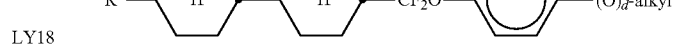

Y4

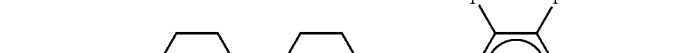

Y5

Y6

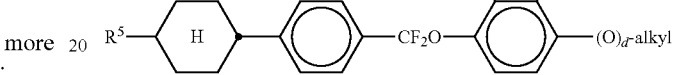

Y7

Y8

Y9

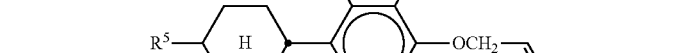

Y10

Y11

Y12

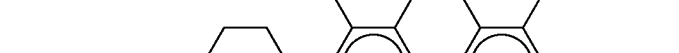
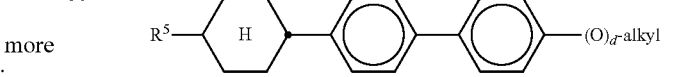
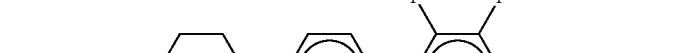

-continued

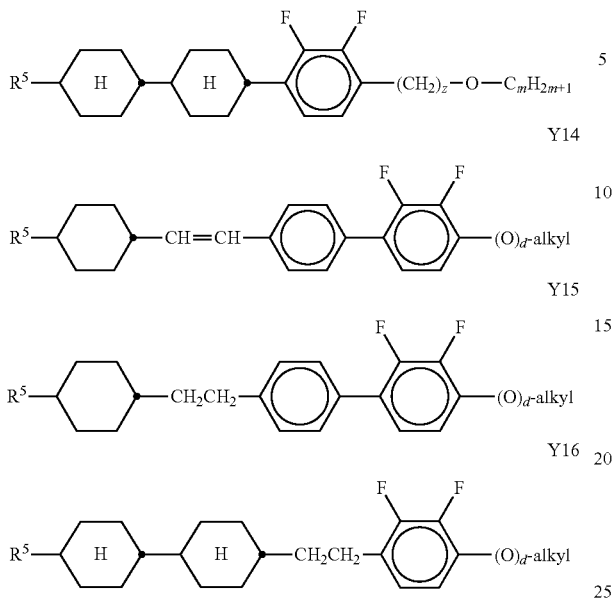

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy, d is preferably 1. The LC medium according to the invention preferably comprises one or more compounds of the above-mentioned formulae in amounts of 5% by weight.

g) LC medium which additionally comprises one or more biphenyl compounds of the following formula:

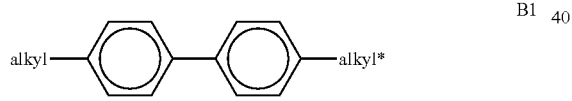
B1 in which alkyl and alkyl* each, independently of one another, denote a straight-chain alkyl radical having 1-6 C atoms.

The proportion of the biphenyls of the formula B1 in the LC mixture is preferably at least 3% by weight, in particular ≥5% by weight.

The compounds of the formula B1 are preferably selected from the following sub-formula:

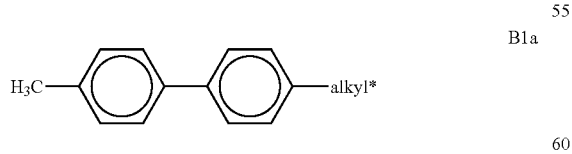
B1a in which alkyl* denotes an alkyl radical having 1-6 C atoms. The medium according to the invention particularly preferably comprises one or more compounds of the formula B1a.

h) LC medium which additionally comprises one or more terphenyl compounds of the following formula:

T in which $R^5$ and $R^6$ each, independently of one another, have one of the meanings indicated above for $R^1$, and

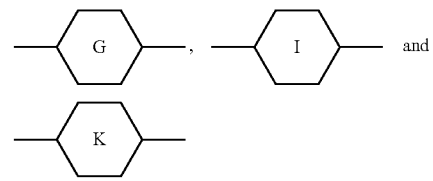

each, independently of one another, denote

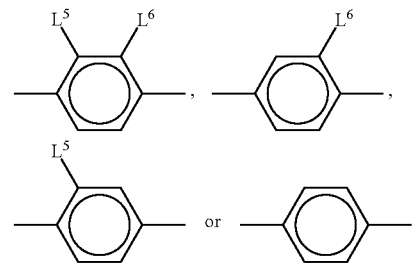

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the following sub-formulae:

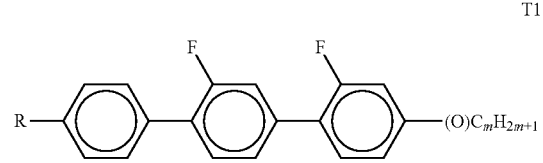
T1

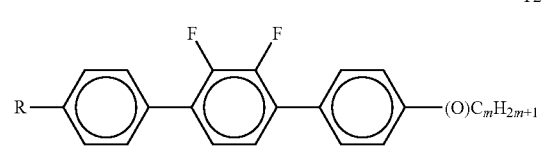
T2

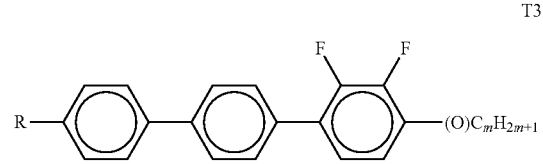
T3

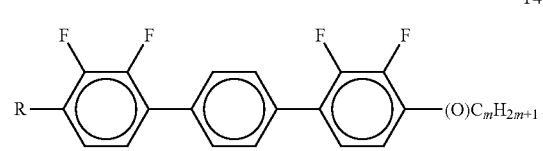
T4

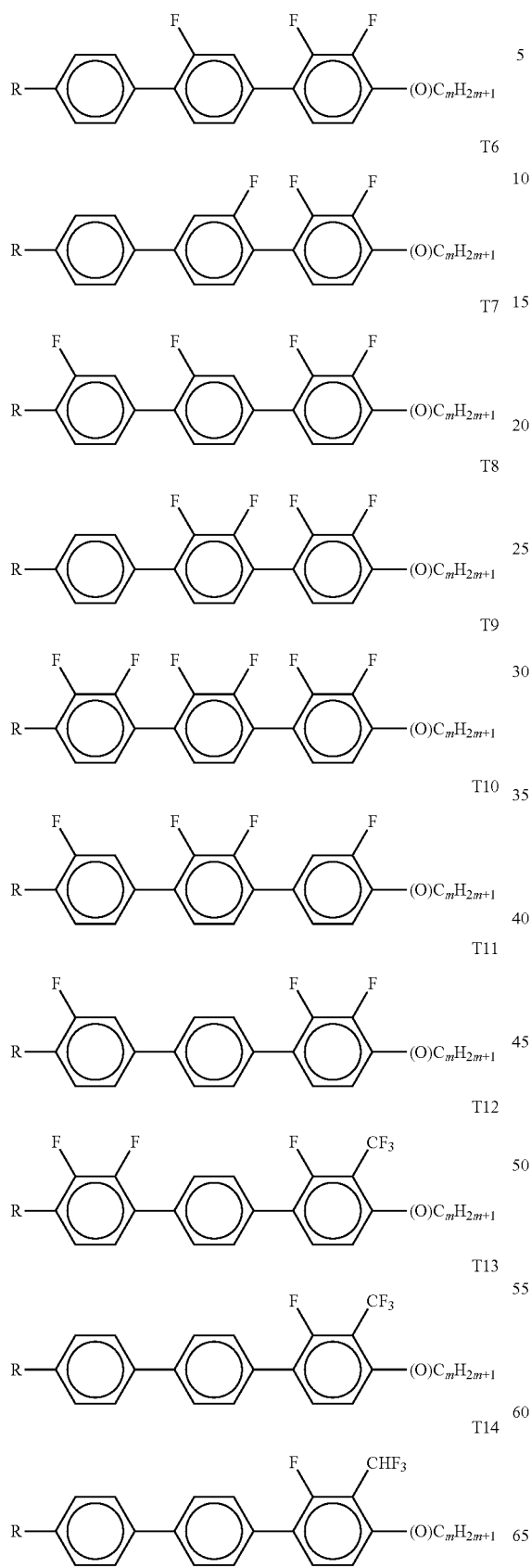

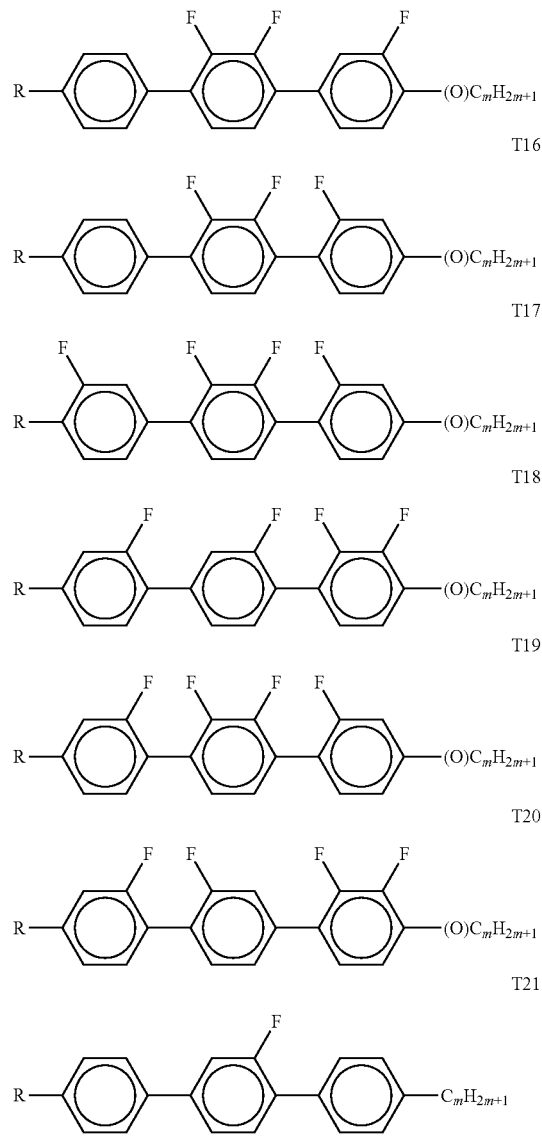

in which R denotes a straight-chain alkyl or alkoxy radical having 1-7 C atoms, and m denotes an integer from 1 to 6.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and preferred sub-formulae thereof in an amount of 2-30% by weight, in particular 5-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of the compounds T1 to T21.

i) LC medium which additionally comprises one or more compounds of the following formulae:

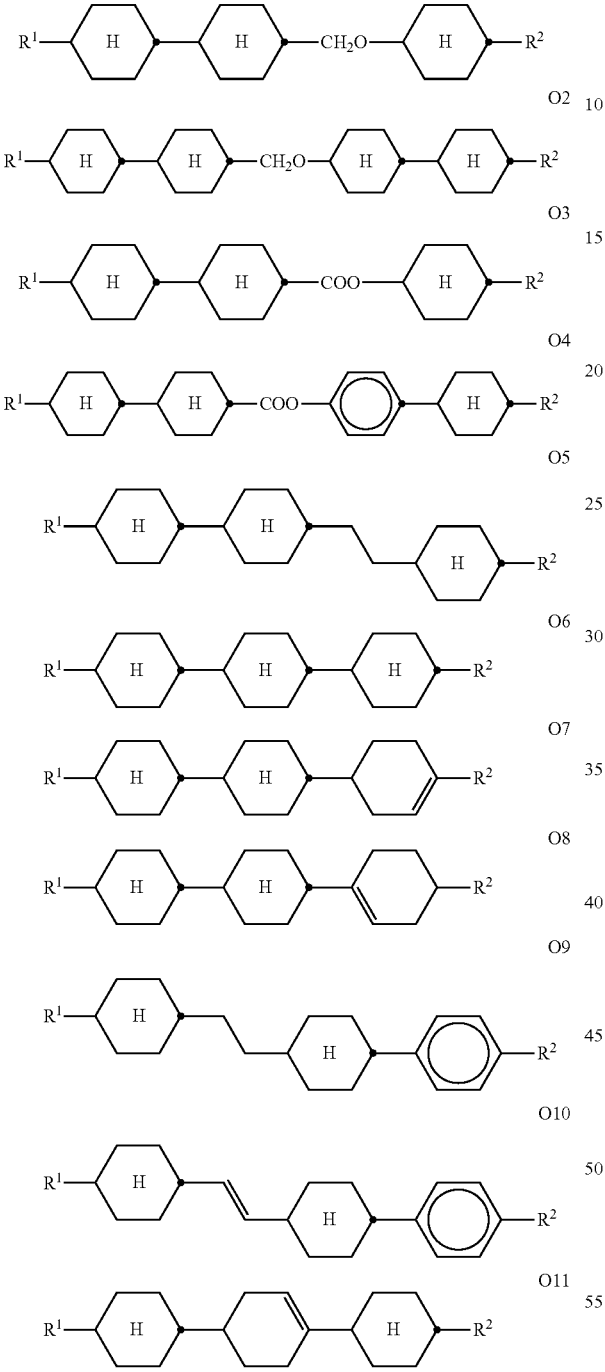

in which $R^1$ and $R^2$ have the above-mentioned meanings and preferably each, independently of one another, denote straight-chain alkyl.

Preferred media comprise one or more compounds selected from the formulae O1, O3 and O4.

k) LC medium which additionally comprises one or more compounds of the following formula:

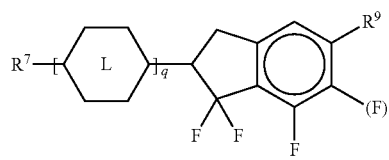

in which

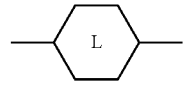

denotes

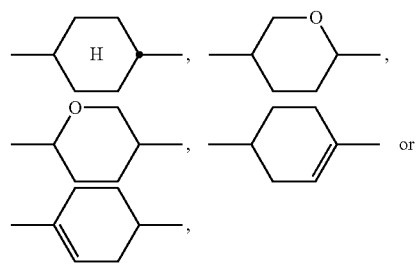

$R^9$ denotes H, $CH_3$, $C_2H_5$ or $n\text{-}C_3H_7$, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula IF are selected from the following sub-formulae:

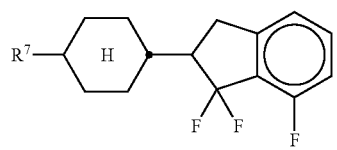

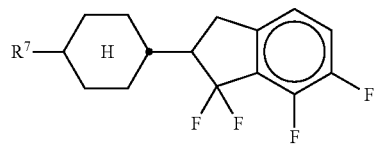

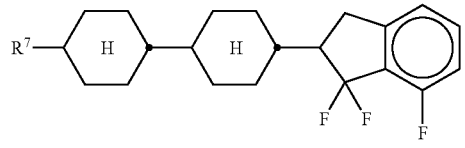

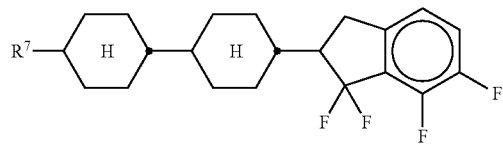

-continued

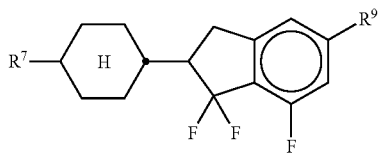
FI5

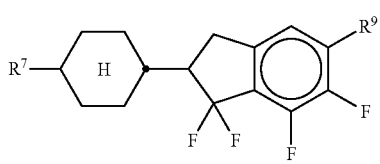
FI6

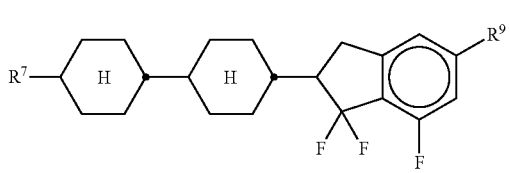
FI7

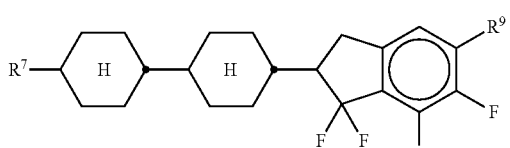
FI8 in which $R^7$ preferably denotes straight-chain alkyl, and $R^9$ denotes $CH_3$, $C_2H_5$ or $n\text{-}C_3H_7$. Particular preference is given to the compounds of the formulae FI1, FI2 and FI3.

m) LC medium which additionally comprises one or more compounds of the following formulae:

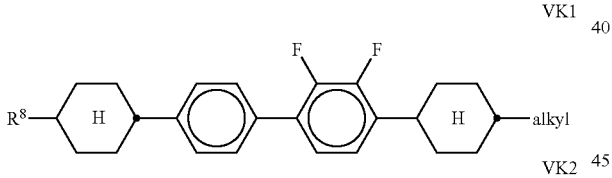
VK1

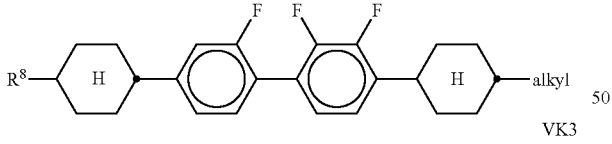
VK2

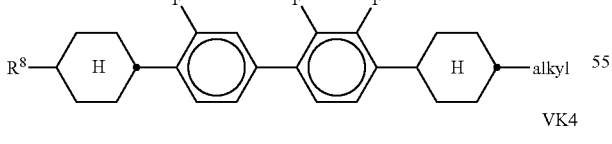
VK3

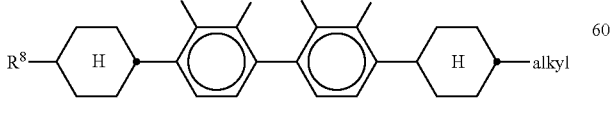
VK4 in which $R^8$ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the following formulae:

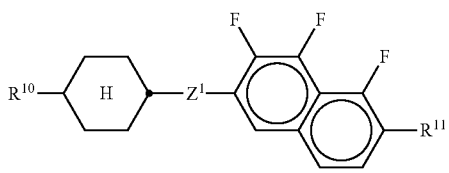
N1

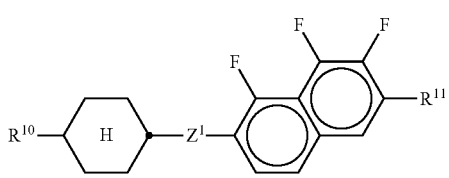
N2

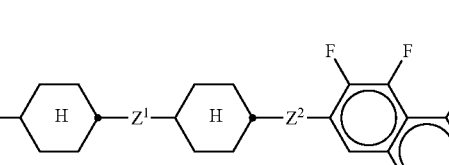
N3

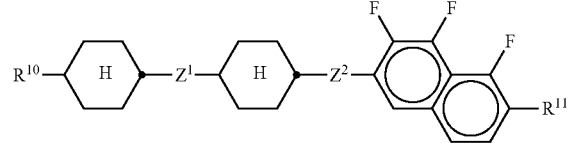
N4

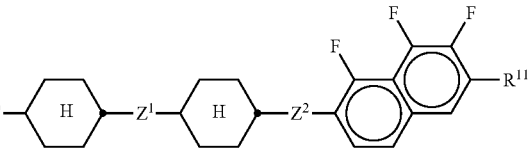
N5

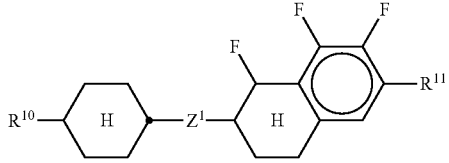
N6

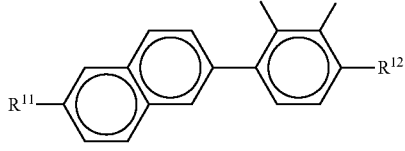
N7

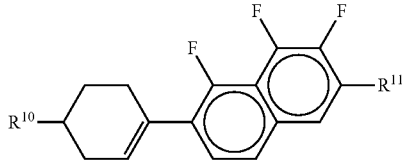
N8

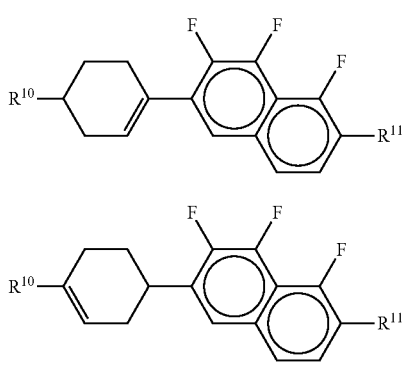
N9

N10 in which $R^{10}$ and $R^{11}$ each, independently of one another, have one of the meanings indicated for $R^1$, preferably denote straight-chain alkyl or straight-chain alkoxy, and Z, $Z^1$ and $Z^2$ each, independently of one another, denote —$C_2H_4$—, —CH=CH—, —$(CH_2)_4$—, —$(CH_2)_3$O—, —O$(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CH$_2$— or a single bond.

o) LC medium which additionally comprises one or more difluorodibenzochromans and/or chromans of the following formulae:

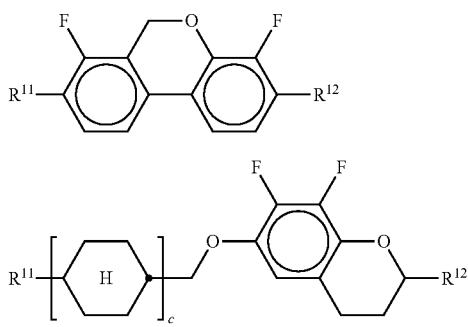
BC

CR in which $R^{11}$ and $R^{12}$ each, independently of one another, have the above-mentioned meanings, and c denotes 0 or 1, preferably in amounts of 3 to 20% by weight, in particular in amounts of 3 to 15% by weight.

Particularly preferred compounds of the formulae BC and CR are selected from the following sub-formulae:

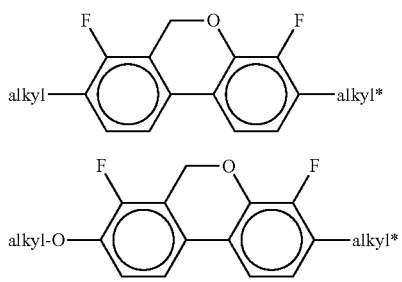
BC1

BC2

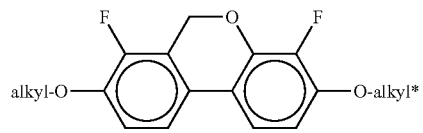
BC3

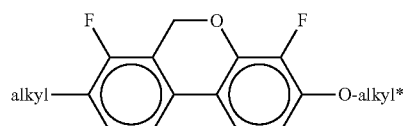
BC4

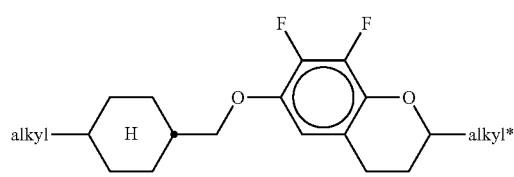
CR1

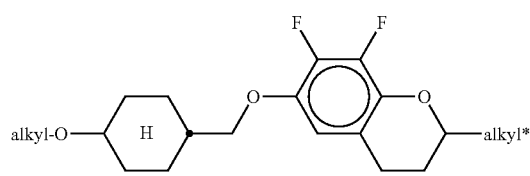
CR2

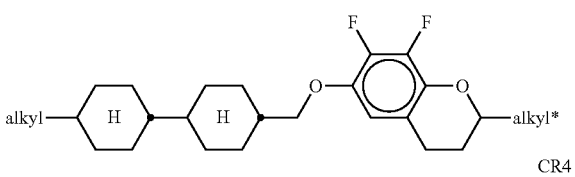
CR3

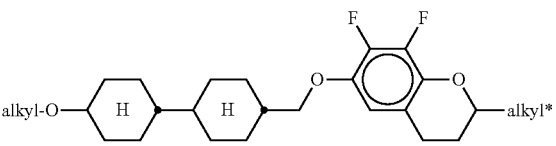
CR4 in which alkyl and alkyl* each, independently of one another, denote a straight-chain alkyl radical having 1-6 C atoms.

Very particular preference is given to mixtures comprising one, two or three compounds of the formula BC-2.

p) LC medium which additionally comprises one or more fluorinated phenanthrenes or dibenzofurans of the following formulae:

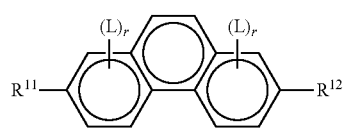
PH

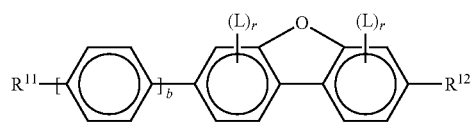
BF in which $R^{11}$ and $R^{12}$ each, independently of one another, have the above-mentioned meanings, b denotes 0 or 1, L denotes F, and r denotes 1, 2 or 3.

Particularly preferred compounds of the formulae PH and BF are selected from the following sub-formulae:

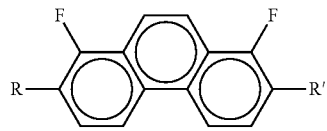
PH1

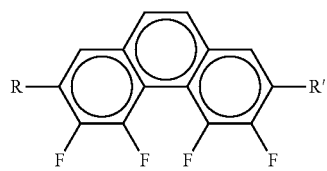
PH2

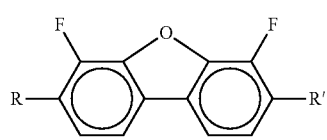
BF1

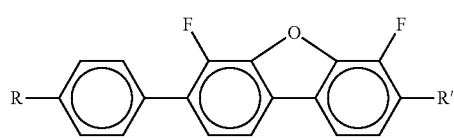
BF2 in which R and R' each, independently of one another, denote a straight-chain alkyl or alkoxy radical having 1-7 C atoms.

q) LC medium, preferably for use in PSA-OCB displays, which comprises one or more compounds of the following formulae:

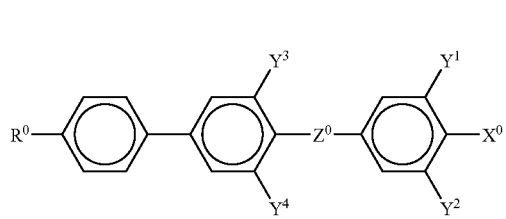
AA

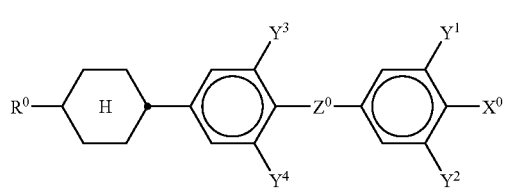
BB

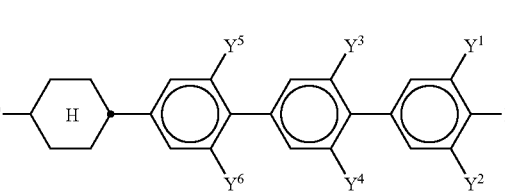
CC in which $R^0$ on each occurrence, identically or differently, denotes n-alkyl, alkoxy, oxaalkyl, fluoroalkyl or alkenyl, each having up to 9 C atoms, $X^0$ denotes F, Cl or in each case halogenated alkyl, alkenyl, alkenyloxy or alkoxy, each having up to 6 C atoms, $Z^0$ denotes —CF$_2$O— or a single bond, $Y^{1-6}$ each, independently of one another, denote H or F.

$X^0$ is preferably F, Cl, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH=CF$_2$, particularly preferably F or OCF$_3$.

The compounds of the formula AA are preferably selected from the following formulae:

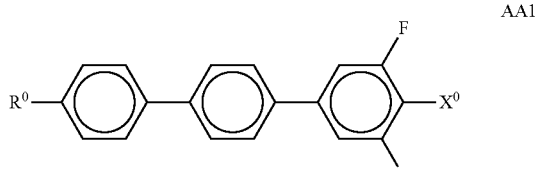
AA1

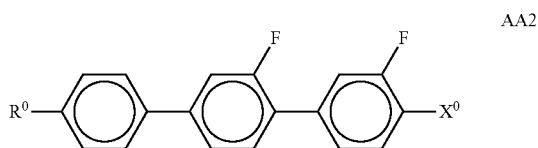
AA2

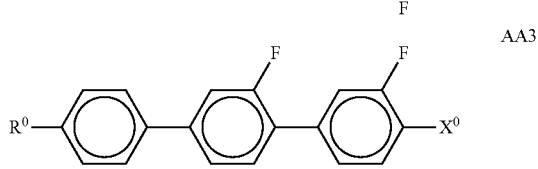
AA3

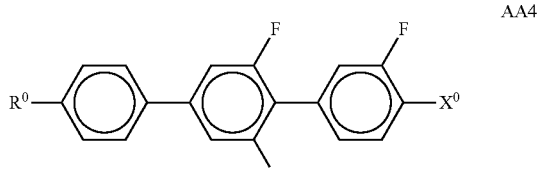
AA4

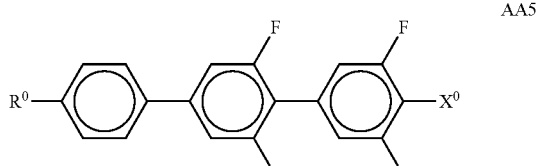
AA5

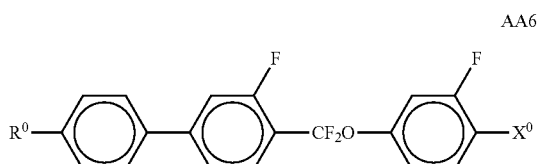
AA6

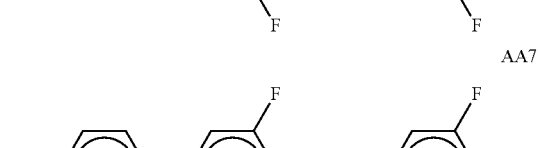
AA7

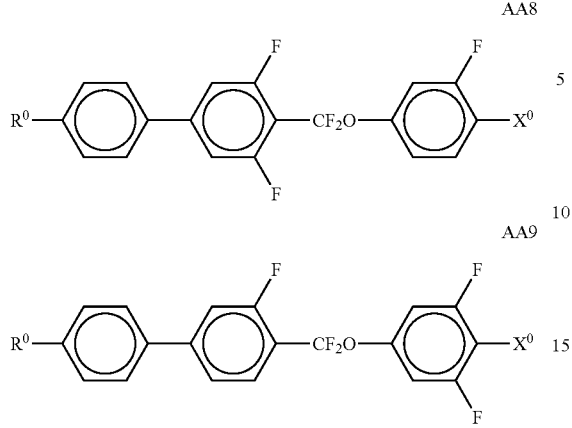

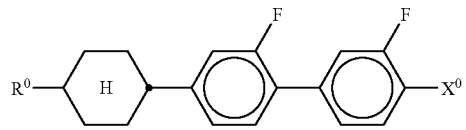

in which R⁰ and X⁰ have the above-mentioned meanings, and X⁰ preferably denotes F. Particular preference is given to compounds of the formulae AA2 and AA6.

The compounds of the formula BB are preferably selected from the following formulae:

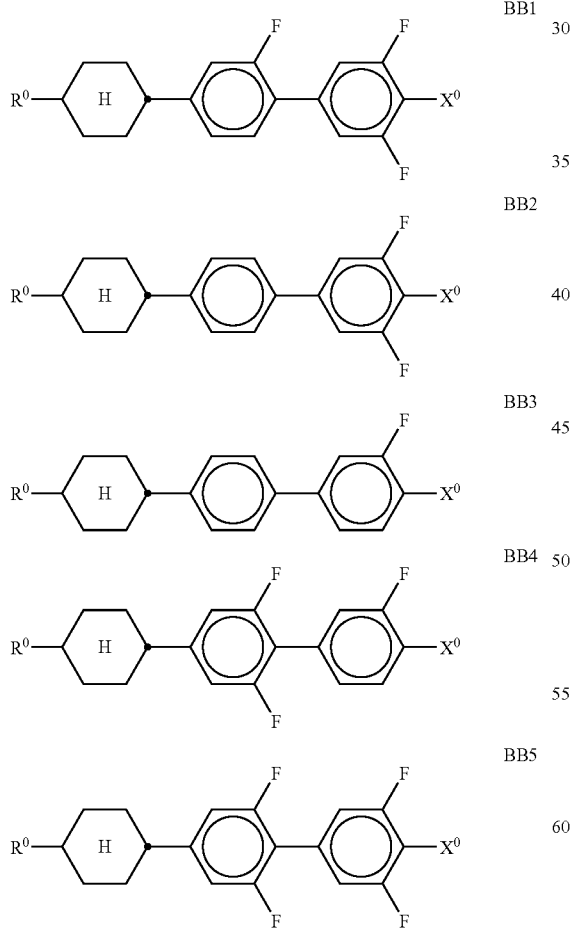

in which R⁰ and X⁰ have the above-mentioned meanings, and X⁰ preferably denotes F. Particular preference is given to compounds of the formulae BB1, BB2 and BB5.

The compounds of the formula CC are preferably selected from the following formula:

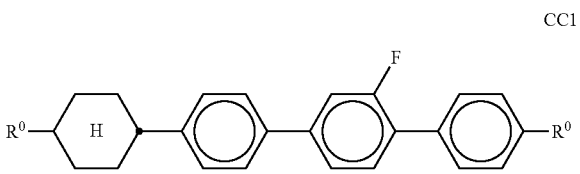

in which R⁰ on each occurrence, identically or differently, has the above-mentioned meaning and preferably denotes alkyl having 1 to 6 C atoms.

r) LC medium which, apart from the polymerisable compounds of the formula I or II or sub-formulae thereof and the comonomers, comprises no compounds which contain a terminal vinyl or vinyloxy group (—CH=CH₂, —O—CH=CH₂).

s) LC medium which comprises 1 to 5, preferably 1, 2 or 3, polymerisable compounds.

t) LC medium in which the proportion of polymerisable compounds in the mixture as a whole is 0.05 to 5%, preferably 0.1 to 1%.

u) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

v) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

w) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the mixture as a whole is greater than 70%, preferably greater than 80%.

The combination of compounds of the preferred embodiments a)-x) mentioned above with the polymerised compounds described above effects low threshold voltages, low rotational viscosities and very good low-temperature stabilities with maintenance of high clearing points and high HR values in the LC media according to the invention and allows a pretilt angle to be set in PS(A) displays. In particular, the LC media exhibit significantly shortened response times, in particular also the grey-shade response times, in PS(A) displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

LC media according to the invention for use in displays of the VA type have a negative dielectric anisotropy $\Delta\epsilon$, preferably of about −0.5 to −7.5, in particular of about −2.5 to −5.5, at 20° C. and 1 kHz.

LC media according to the invention for use in displays of the OCB type have a positive dielectric anisotropy $\Delta\epsilon$, preferably of about +7 to +17 at 20° C. and 1 kHz.

The birefringence $\Delta n$ in LC media according to the invention for use in displays of the VA type is preferably less than 0.16, particularly preferably between 0.06 and 0.14, in particular between 0.07 and 0.12.

The birefringence $\Delta n$ in LC media according to the invention for use in displays of the OCB type is preferably between 0.14 and 0.22, in particular between 0.16 and 0.22.

The dielectrics may also comprise further additives known to the person skilled in the art and described in the literature. For example, 0 to 15% by weight of pleochroic dyes may be added, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), may be added in order to improve the conductivity, or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-x) of the LC media according to the invention are either known or the ways in which they are prepared can readily be derived from the prior art by the person skilled in the relevant art since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The construction of the LC displays according to the invention corresponds to the conventional geometry for PS(A) displays, as described in the prior art cited at the outset. Geometries without protrusions are preferred, in particular those in which, in addition, the electrode on the colour filter side is unstructured and only the electrode on the TFT side has slits. Particularly suitable and preferred electrode structures for PSA-VA displays are described, for example, in US 2006/0066793 A1.

The following examples explain the present invention without limiting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(n, m, z: each, independently of one another, 1, 2, 3, 4, 5 or 6)

TABLE A

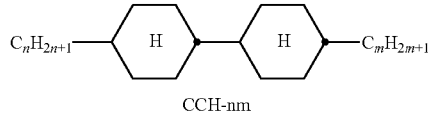

CCH-nm

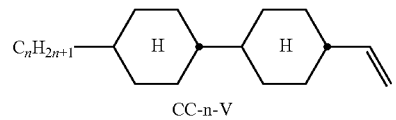

CC-n-V

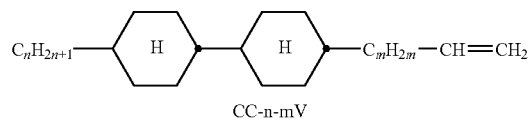

CC-n-mV

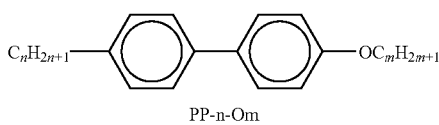

PP-n-Om

TABLE A-continued
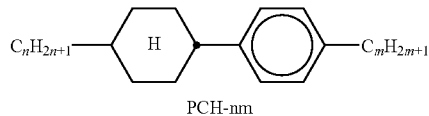
PCH-nm
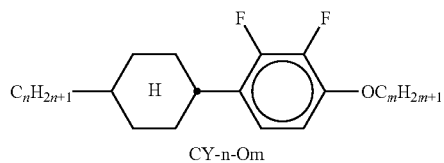
CY-n-Om
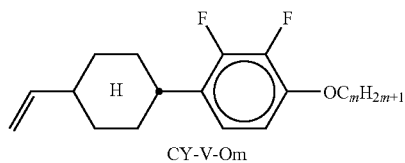
CY-V-Om
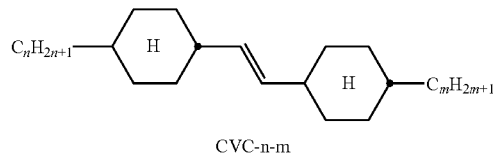
CVC-n-m
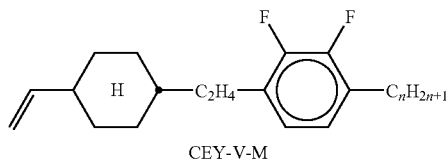
CEY-V-M
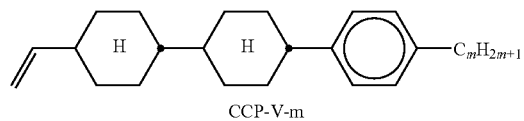
CCP-V-m
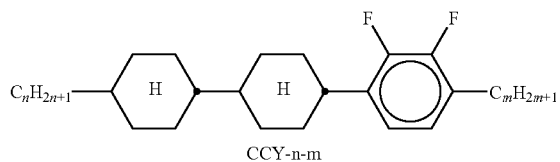
CCY-n-m
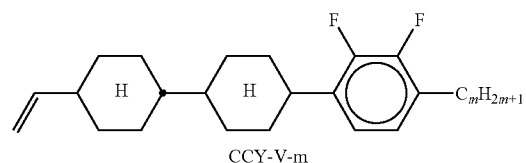
CCY-V-m
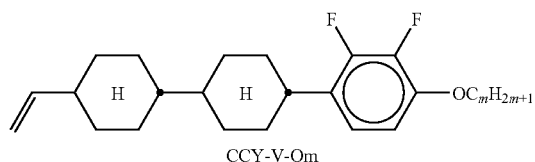
CCY-V-Om TABLE A-continued
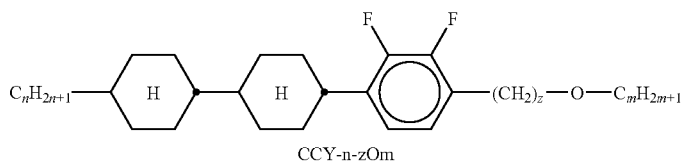
CCY-n-zOm
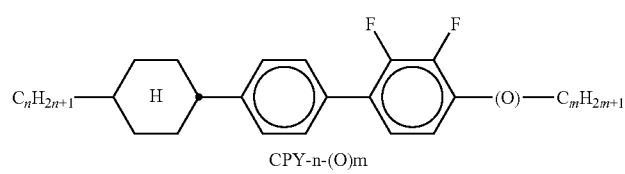
CPY-n-(O)m
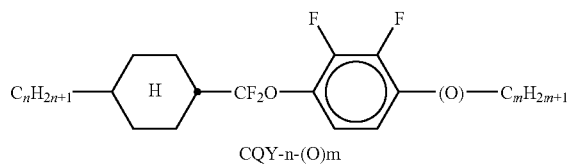
CQY-n-(O)m
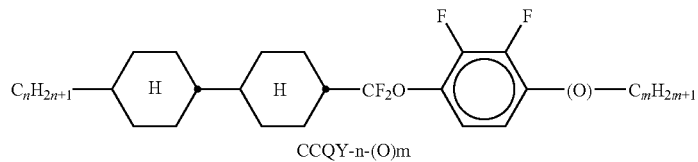
CCQY-n-(O)m
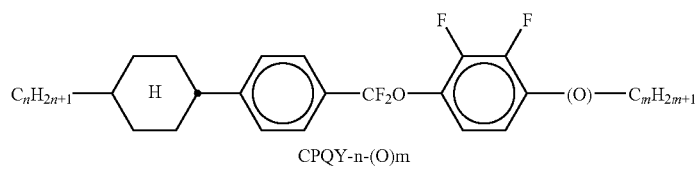
CPQY-n-(O)m
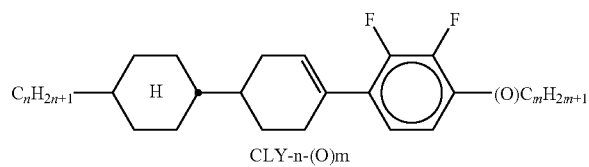
CLY-n-(O)m
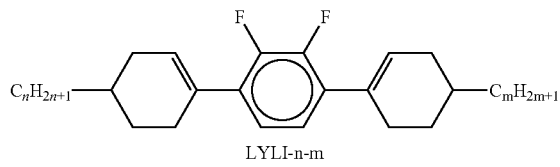
LYLI-n-m
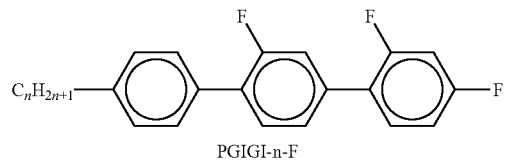
PGIGI-n-F
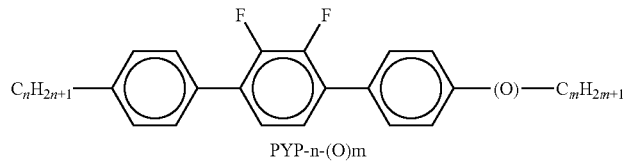
PYP-n-(O)m TABLE A-continued
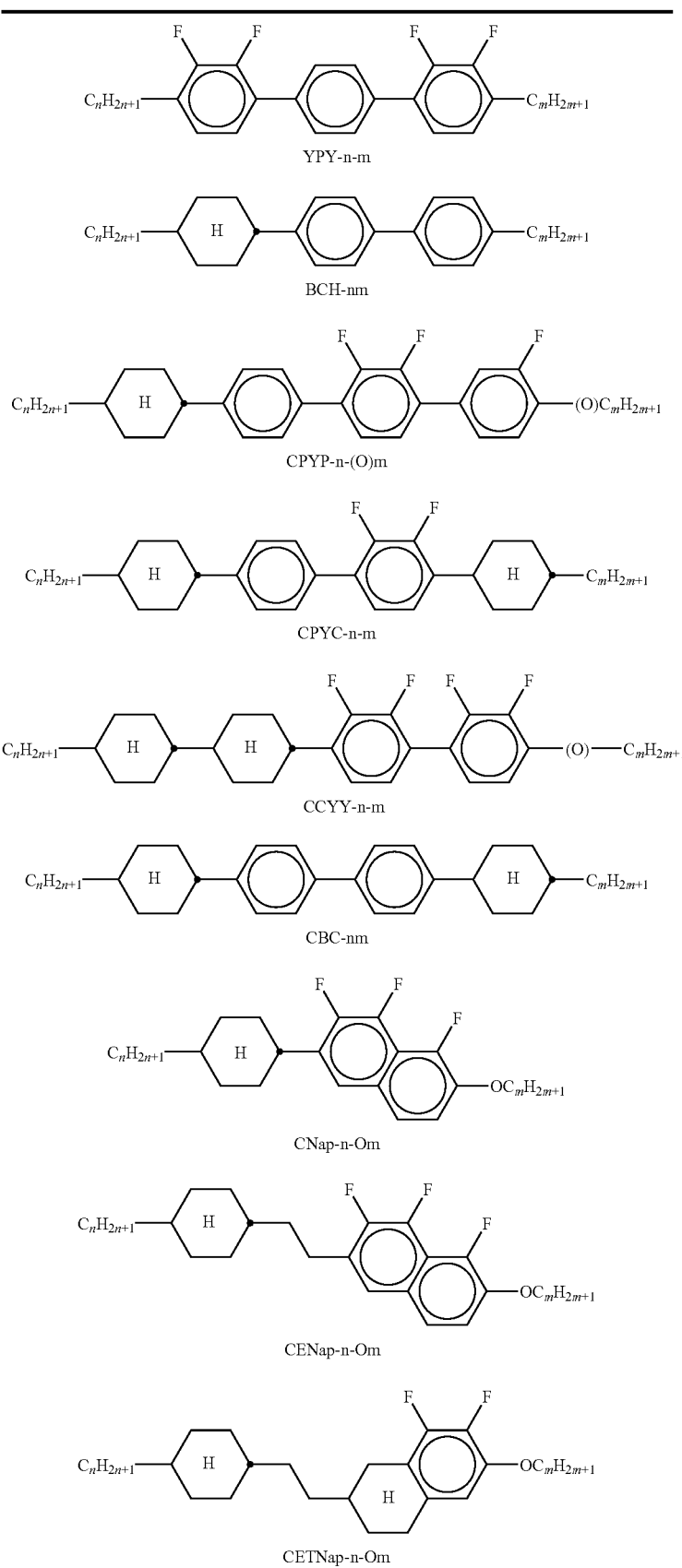

TABLE A-continued
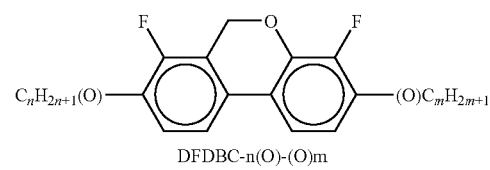
DFDBC-n(O)-(O)m
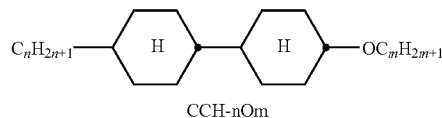
CCH-nOm
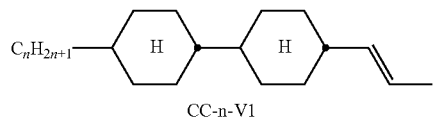
CC-n-V1
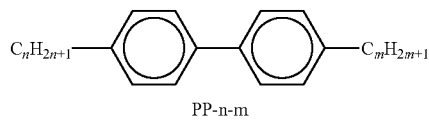
PP-n-m
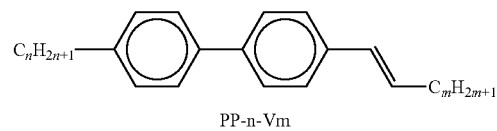
PP-n-Vm
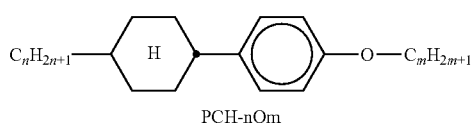
PCH-nOm
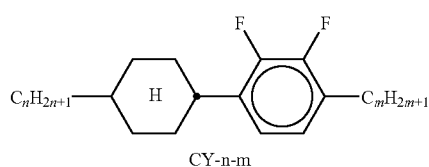
CY-n-m
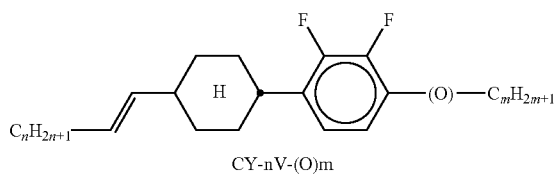
CY-nV-(O)m
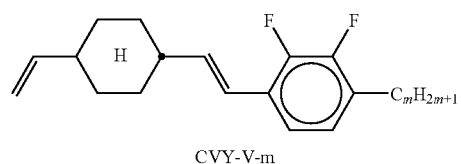
CVY-V-m
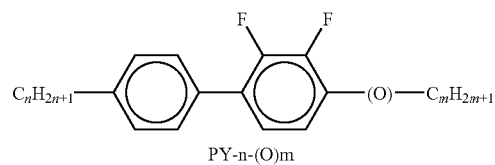
PY-n-(O)m TABLE A-continued
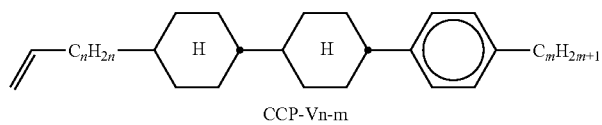
CCP-Vn-m
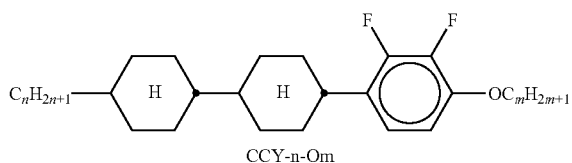
CCY-n-Om
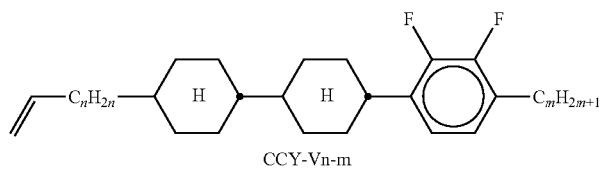
CCY-Vn-m
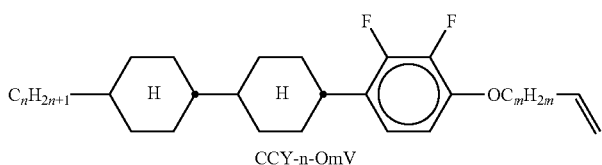
CCY-n-OmV
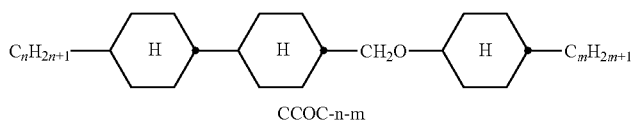
CCOC-n-m
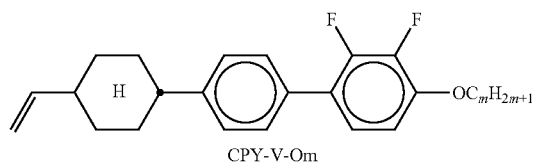
CPY-V-Om
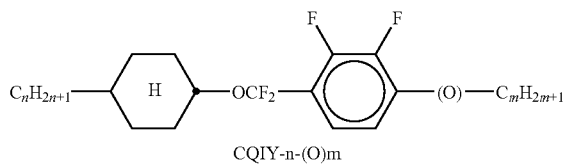
CQIY-n-(O)m
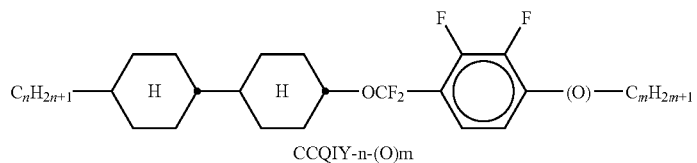
CCQIY-n-(O)m
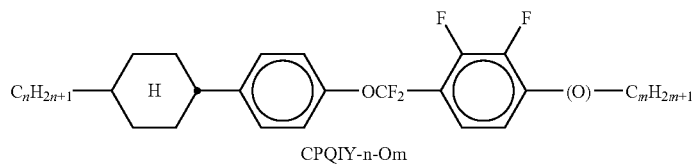
CPQIY-n-Om TABLE A-continued
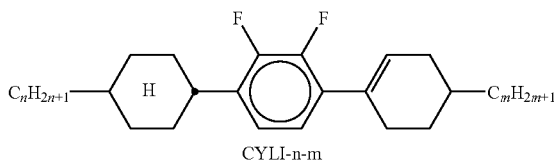
CYLI-n-m
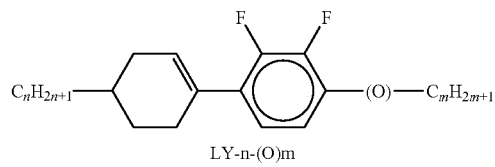
LY-n-(O)m
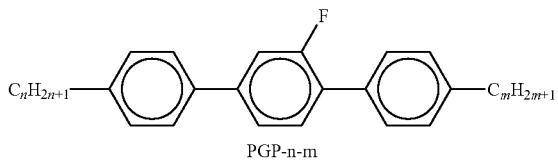
PGP-n-m
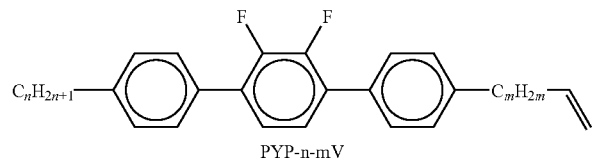
PYP-n-mV
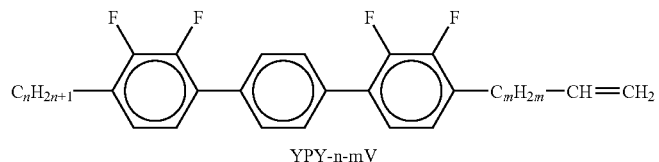
YPY-n-mV
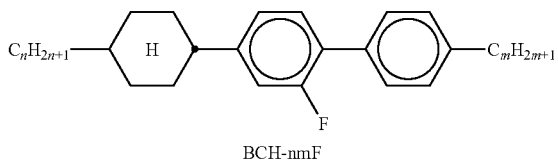
BCH-nmF
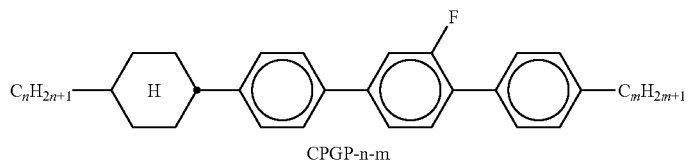
CPGP-n-m
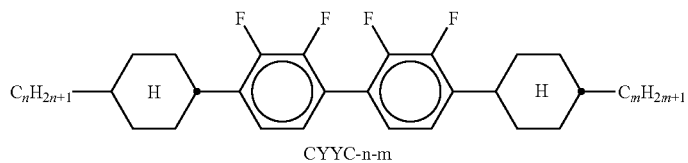
CYYC-n-m
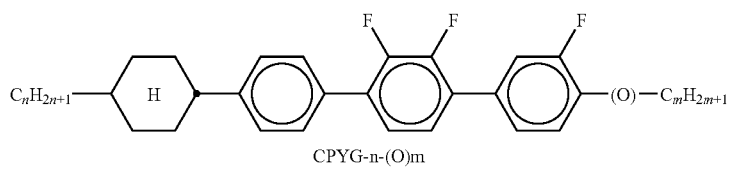
CPYG-n-(O)m TABLE A-continued
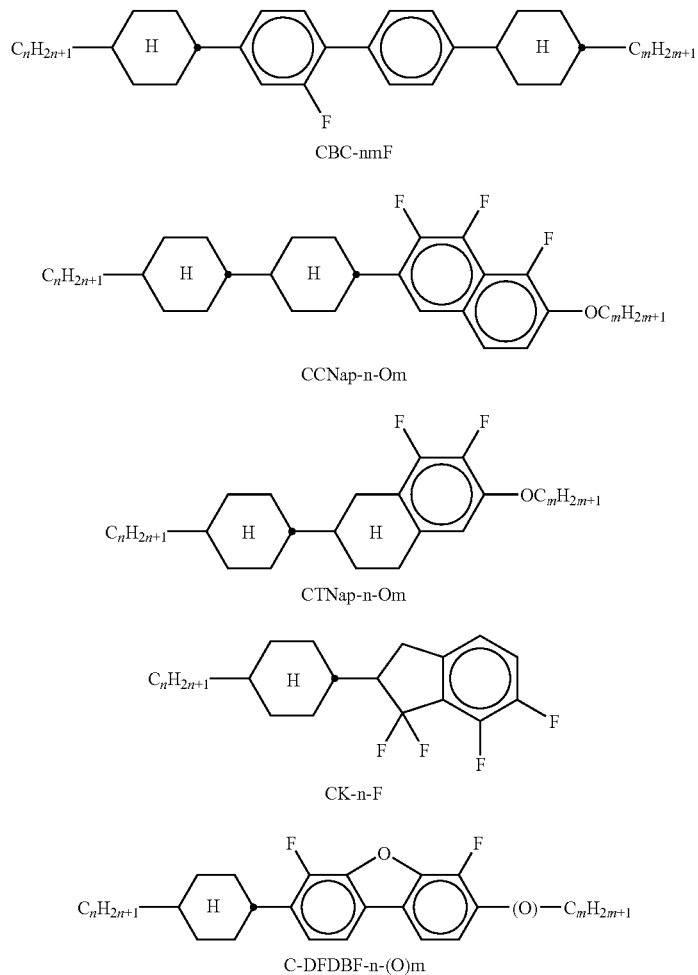
In a preferred embodiment of the present invention, the LC media according to the invention comprise one or more compounds selected from the group consisting of compounds from Table A.
TABLE B
Table B indicates possible dopants which can be added to the LC media according to the invention.
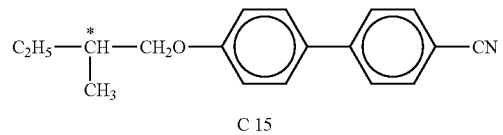
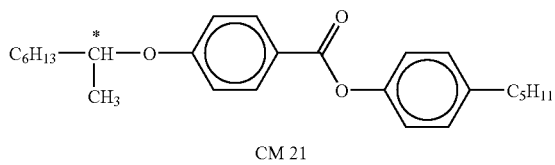

TABLE B-continued
Table B indicates possible dopants which can be added to the LC media according to the invention.
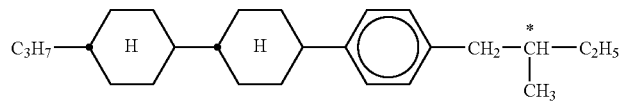
CM 44
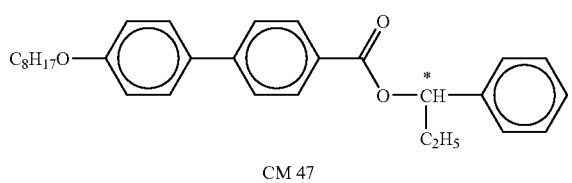
CM 47
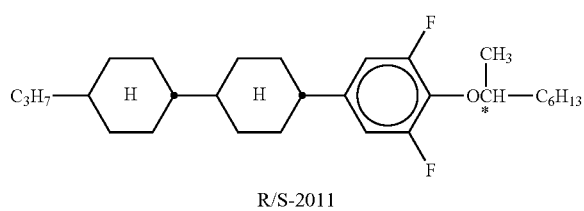
R/S-2011
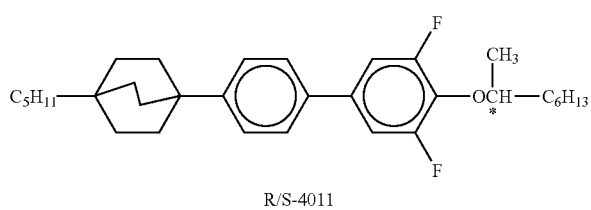
R/S-4011
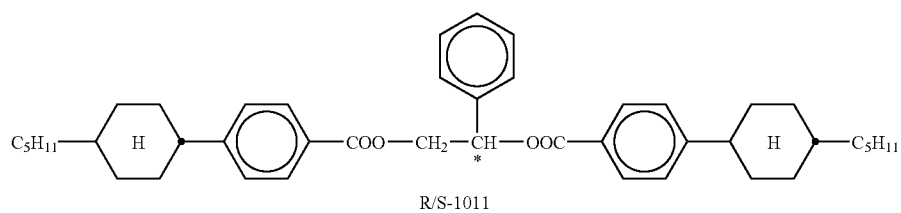
R/S-1011
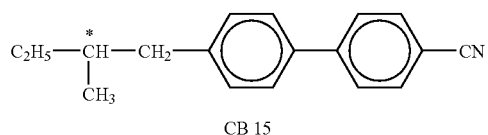
CB 15
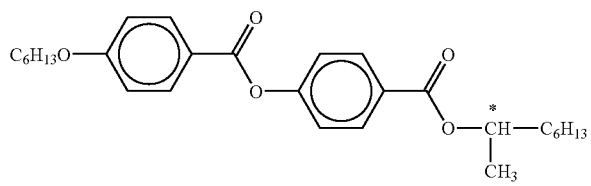
R/S-811
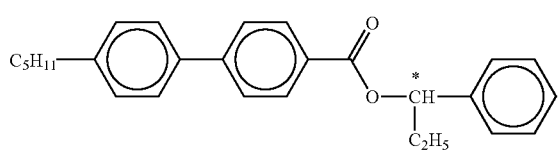
CM 45

TABLE B-continued

Table B indicates possible dopants which can be added to the LC media according to the invention.

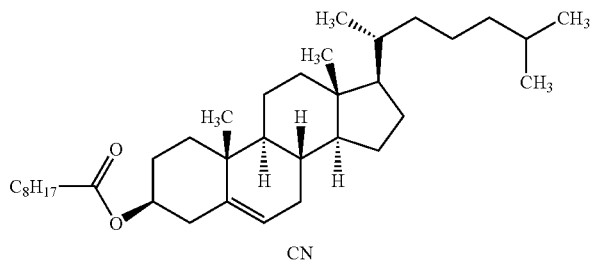

CN

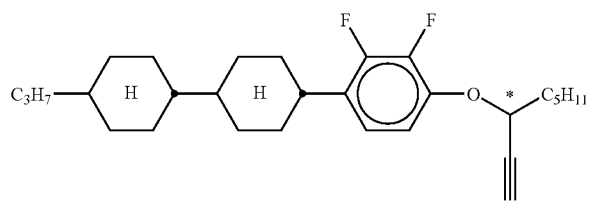

R/S-3011

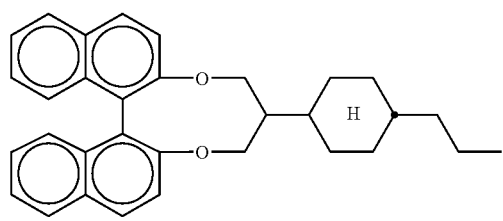

R/S-5011

The LC media preferably comprise 0 to 10% by weight, in particular 0.01 to 5% by weight and particularly preferably 0.1 to 3% by weight, of dopants. The LC media preferably comprise one or more dopants selected from the group consisting of compounds from Table B.

TABLE C

Table C indicates possible stabilisers which can be added to the LC media according to the invention.

(n here denotes an integer from 1 to 12)

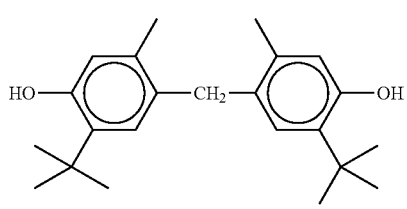

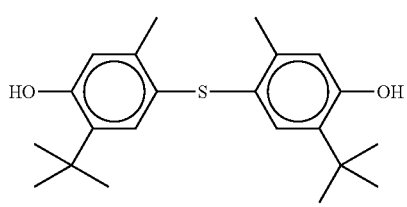

TABLE C-continued
Table C indicates possible stabilisers which can be added to the LC media according to the invention.
(n here denotes an integer from 1 to 12)
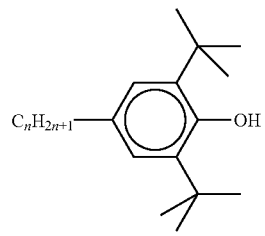
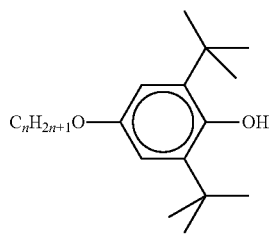
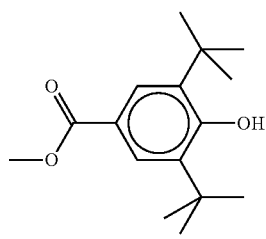
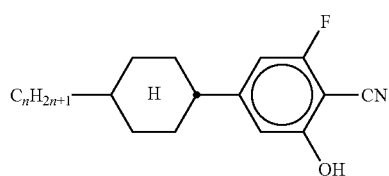
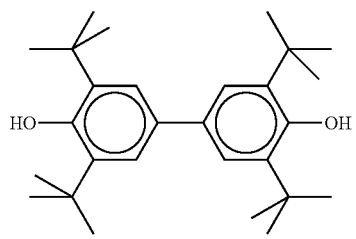
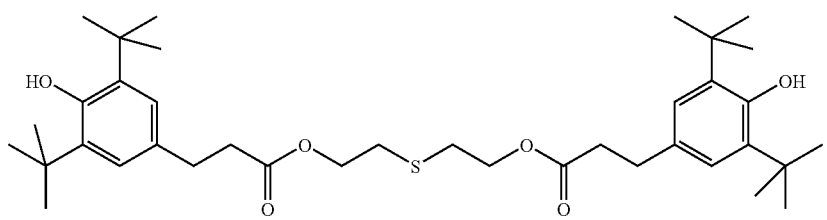 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
Table C indicates possible stabilisers which can be added to the LC media according to the invention.
(n here denotes an integer from 1 to 12)
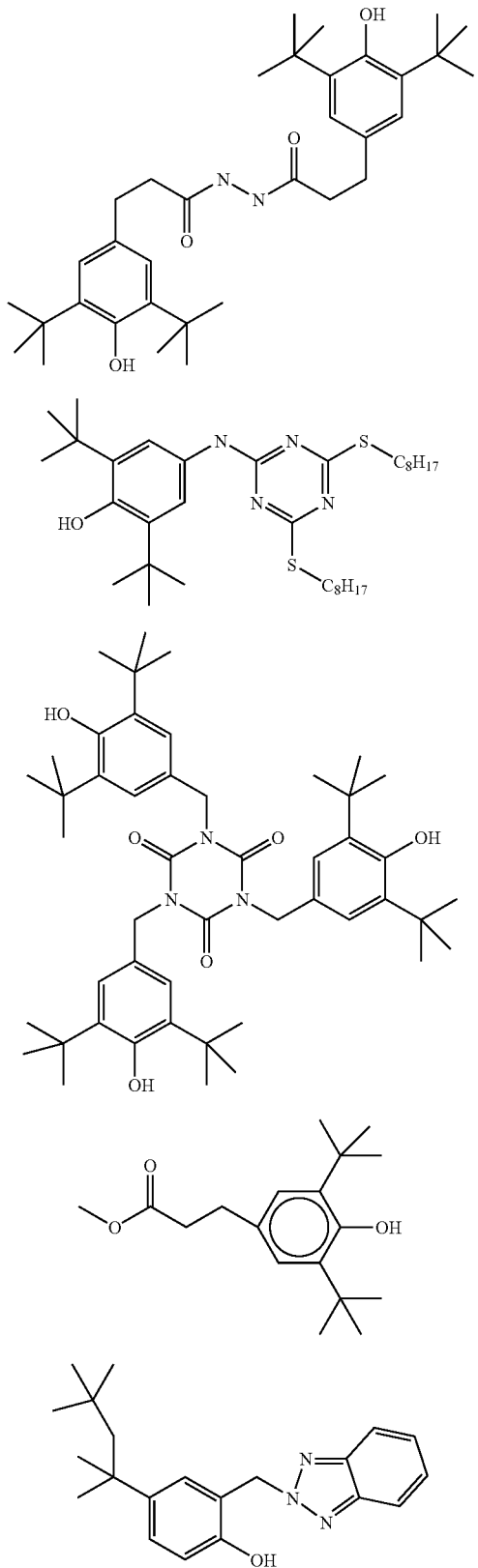

TABLE C-continued
Table C indicates possible stabilisers which can be added to the LC media according to the invention.
(n here denotes an integer from 1 to 12)
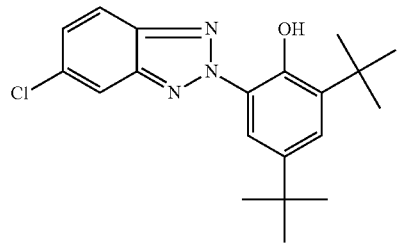 [SMILES: CC(C)(C)c1cc(-n2nc3ccc(Cl)cc3n2)c(O)c(C(C)(C)C)c1]
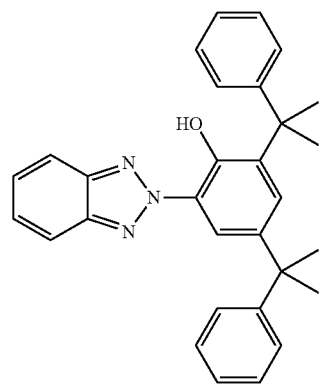 [SMILES: CC(C)(c1ccccc1)c1cc(-n2nc3ccccc3n2)c(O)c(C(C)(C)c2ccccc2)c1]
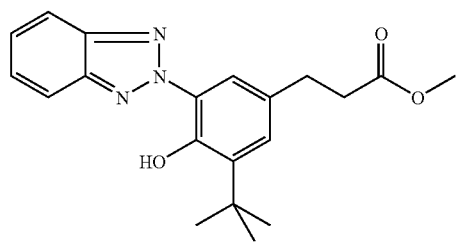 [SMILES: COC(=O)CCc1cc(-n2nc3ccccc3n2)c(O)c(C(C)(C)C)c1]
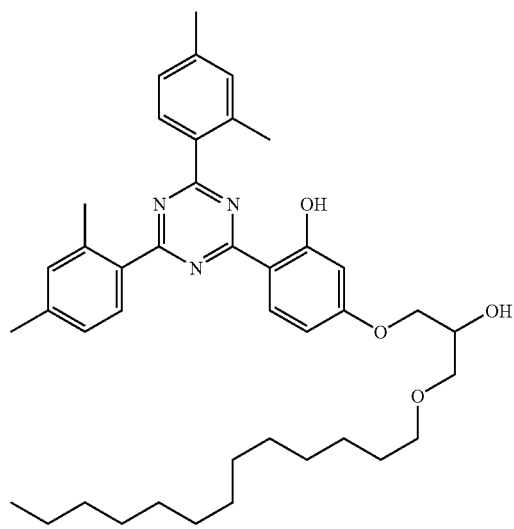 [SMILES: CCCCCCCCCCCCCOCC(O)COc1ccc(-c2nc(-c3ccc(C)cc3C)nc(-c3ccc(C)cc3C)n2)c(O)c1]

TABLE C-continued
Table C indicates possible stabilisers which can be added to the LC media according to the invention.
(n here denotes an integer from 1 to 12)
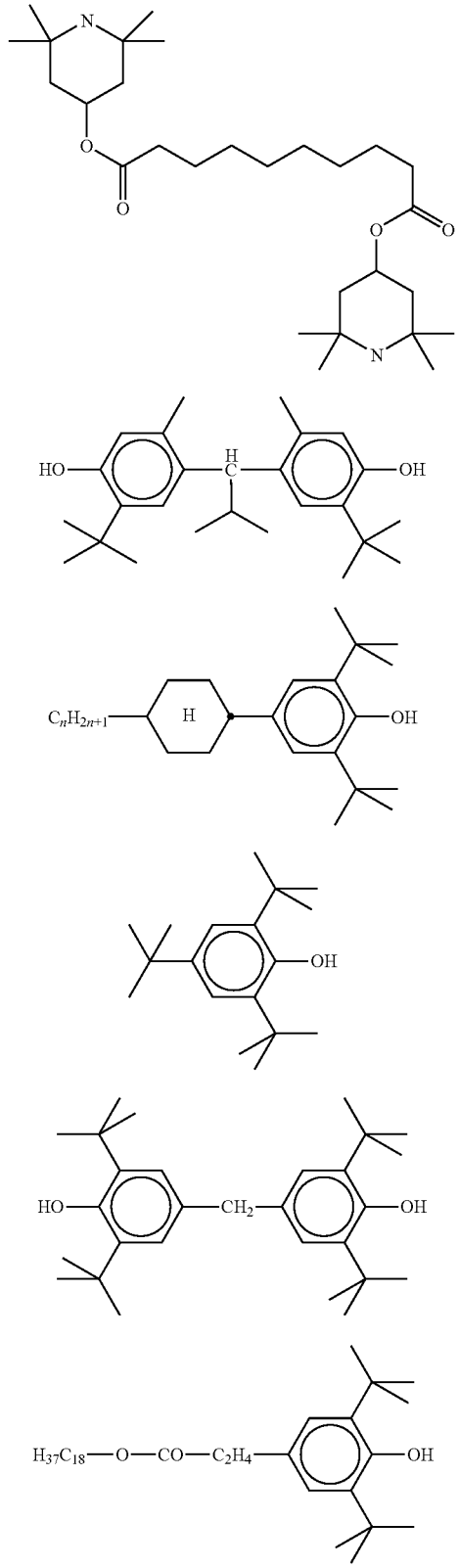

TABLE C-continued
Table C indicates possible stabilisers which can be added to the LC media according to the invention.
(n here denotes an integer from 1 to 12)
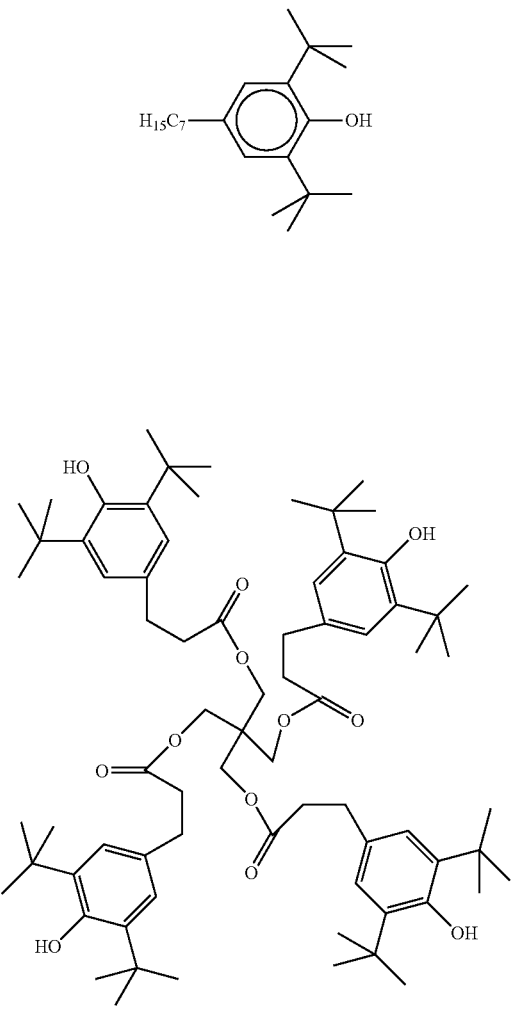
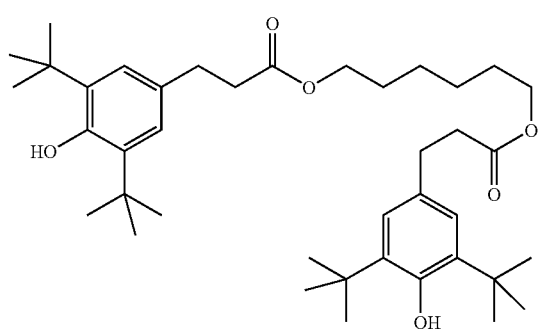 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE C-continued
Table C indicates possible stabilisers which can be added to the LC media according to the invention.
(n here denotes an integer from 1 to 12)
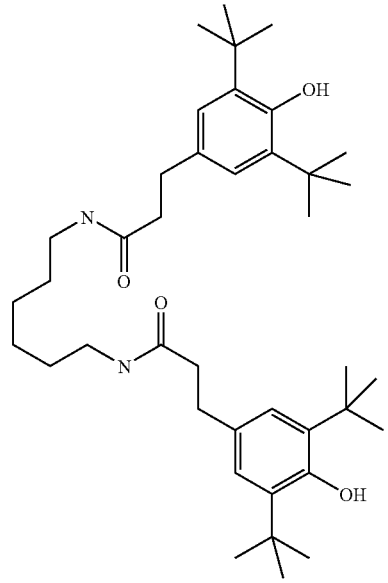 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
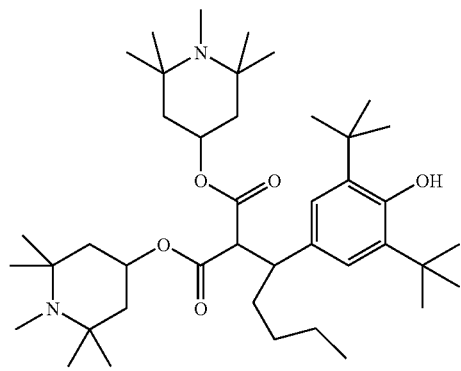 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
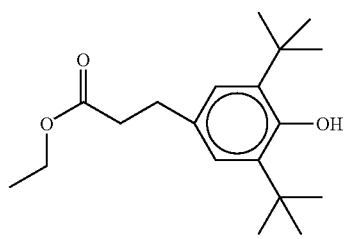
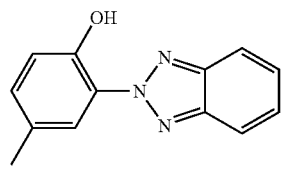 [SMILES: Cc1ccc(O)c(-n2nc3ccccc3n2)c1]
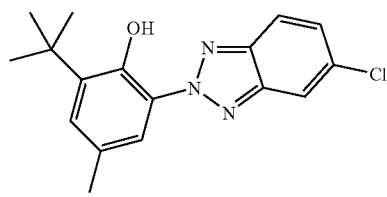 [SMILES: Cc1cc(-n2nc3ccc(Cl)cc3n2)c(O)c(C(C)(C)C)c1]

TABLE C-continued
Table C indicates possible stabilisers which can be added to the LC media according to the invention.
(n here denotes an integer from 1 to 12)
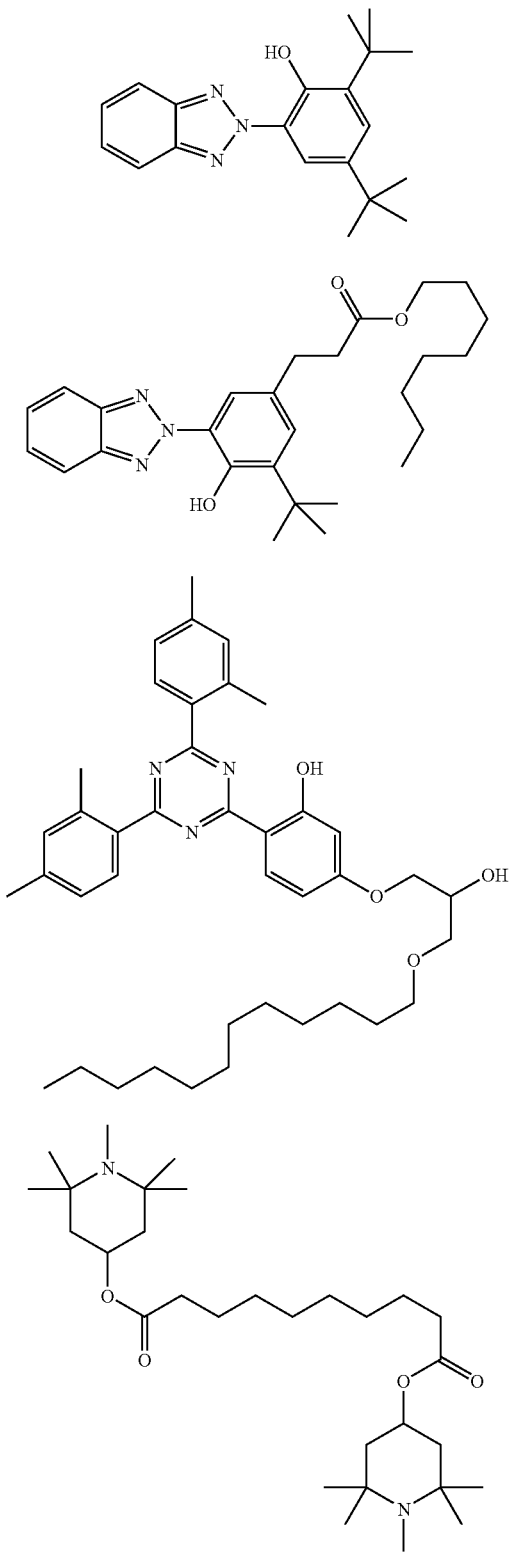

The LC media preferably comprise 0 to 10% by weight, in particular 0.01 to 5% by weight and particularly preferably 0.1 to 3% by weight, of stabilisers. The LC media preferably comprise one or more stabilisers selected from the group consisting of compounds from Table C.

In addition, the following abbreviations and symbols are used:

$V_o$ denotes threshold voltage, capacitive [V] at 20° C.,
$n_e$ denotes extraordinary refractive index at 20° C. and 589 nm,
$n_o$ denotes ordinary refractive index at 20° C. and 589 nm,
Δn denotes optical anisotropy at 20° C. and 589 nm,
$\in_\perp$ denotes dielectric susceptibility perpendicular to the director at 20° C. and 1 kHz,
$\in_\parallel$ denotes dielectric susceptibility parallel to the director at 20° C. and 1 kHz,
Δ∈ denotes dielectric anisotropy at 20° C. and 1 kHz,
cl.p., T(N,I) denotes clearing point [° C.],
$\gamma_1$ denotes rotational viscosity at 20° C. [mPa·s],
$K_1$ denotes elastic constant, "splay" deformation at 20° C. [pN],
$K_2$ denotes elastic constant, "twist" deformation at 20° C. [pN],
$K_3$ denotes elastic constant, "bend" deformation at 20° C. [pN],
LTS denotes low-temperature stability (phase), determined in test cells,
$HR_{20}$ denotes voltage holding ratio at 20° C. [%], and
$HR_{100}$ denotes voltage holding ratio at 100° C. [%].

Unless explicitly noted otherwise, all concentrations in the present application are indicated in per cent by weight and relate to the corresponding mixture or mixture component, unless explicitly indicated otherwise.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.).

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δ∈ is determined at 1 kHz, unless explicitly indicated otherwise in each case.

For the present invention, the term "threshold voltage" relates to the capacitive threshold ($V_o$), also known as the Freedericksz threshold, unless explicitly indicated otherwise. In the examples, as is generally usual, the optical threshold for 10% relative contrast ($V_{10}$) may also be indicated.

The display used for measurement of the capacitive threshold voltage has two plane-parallel outer plates at a separation of 4 μm and electrode layers with overlying alignment layers of rubbed polyimide on the insides of the outer plates, which cause a homeotropic edge alignment of the liquid-crystal molecules.

The polymerisable compounds are polymerised in the display by UV irradiation for a pre-determined time, with a voltage simultaneously being applied to the display (usually 10 V to 30 V alternating current, 1 kHz). In the examples, unless indicated otherwise, a 28 mW/cm² mercury vapour lamp was used, the intensity was measured using a standard UV meter (model Ushio UNI meter) fitted with a 365 nm band-pass filter.

The tilt angle is determined by a rotational crystal experiment (Autronic-Melchers TBA-105). A small value (i.e. a large deviation from a 90° angle) corresponds to a large tilt here.

EXAMPLE 1

Nematic base LC mixture N1 is formulated as follows:

| | | | |
|---|---|---|---|
| CCH-501 | 9.00% | Cl.p. | +70.0 |
| CCH-35 | 14.00% | Δn | 0.0825 |
| PCH-53 | 8.00% | Δ∈ | −3.5 |
| CY-3-O4 | 14.00% | $\in_\parallel$ | 3.5 |
| CY-5-O4 | 13.00% | $K_3/K_1$ | 1.00 |
| CCY-3-O2 | 8.00% | $\gamma_1$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

Mixtures M1-7 according to the invention are prepared by addition of 0.3% of polymerisable compound RM1 and various percentages of alkenyl compounds of the formula A according to the invention containing a non-terminal double bond to base mixture N1. For comparative purposes, mixtures C1-6 are additionally prepared by addition of 0.3% of compound RM1 and various percentages of alkenyl compounds containing a terminal double bond to base mixture N1. In addition, reference mixture R1 is prepared by addition of 0.3% of compound RM1 to N1, but without addition of alkenyl compounds.

RM1

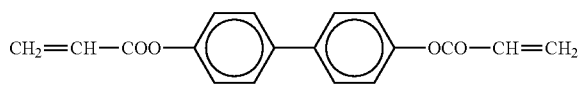

The mixtures are introduced into a VA test cell and polymerised for 20 minutes by UV irradiation as described above. In a second series of experiments, 0.006% of the photoinitiator Irgacure 651® is additionally added to the media, and the irradiation time is shortened to 2 minutes. The tilt angle is then determined for all samples. The results are shown in Table 1.

| | Alkenyl compound | | Tilt [°] without | Tilt [°] with |
|---|---|---|---|---|
| Mixture | Acronym | Concentration | photoinitiator | photoinitiator |
| R1 | — | — | 86.2 | 86.2 |
| M1 | CCP-1V-1 | 10% | 86.4 | 86.9 |
| M2 | CC-3-V1 | 5% | 87.0 | 87.0 |
| M3 | CC-3-V1 | 10% | 87.1 | 87.3 |
| M4 | CC-3-V1 | 15% | 87.9 | 87.9 |
| M5 | CC-4-V1 | 10% | 87.3 | 87.4 |
| M6 | CC-1-V3 | 10% | 87.0 | 87.7 |
| M7 | CC-2V-V2 | 10% | 87.7 | 88.8 |
| C1 | CC-4-V | 5% | 88.9 | 89.7 |
| C2 | CC-5-V | 5% | 87.8 | 88.7 |
| C3 | CC-5-V | 10% | 88.5 | 89.4 |
| C4 | CC-5-V | 15% | 89.2 | 89.7 |
| C5 | CCP-V-1 | 10% | 88.1 | 89.0 |
| C6 | CCP-V2-1 | 10% | 88.0 | 89.3 |

Table 1 shows that a significant tilt angle cannot be measured for any of comparative mixtures C1-6 which comprise an alkenyl compound containing a terminal double bond in relevant percentages (i.e. the preferential alignment of the LC longitudinal molecular axes is close to 90°). By contrast, a significant tilt can be measured for all mixtures M1-7 according to the invention which comprise an alkenyl compound of the formula A according to the invention containing a non-terminal double bond. This tilt is in the same order of magnitude as for reference mixture R1 without an alkenyl compound.

The invention claimed is:

1. A polymer stabilised or polymer sustained alignment liquid-crystal display, containing a liquid-crystal cell comprising two substrates, where at least one substrate is transparent to light and at least one substrate has an electrode layer, and a layer of a liquid-crystal medium comprising a polymerised component and a low-molecular-weight component located between the substrates, where the polymerised component is obtainable by polymerisation of one or more polymerisable compounds between the substrates of the liquid-crystal cell in the liquid-crystal medium with application of an electrical voltage, wherein the low-molecular-weight component comprises one or more compounds of the formula A

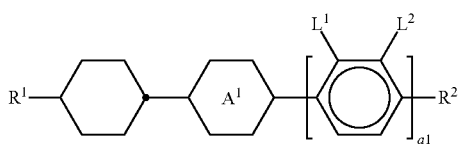

A in which

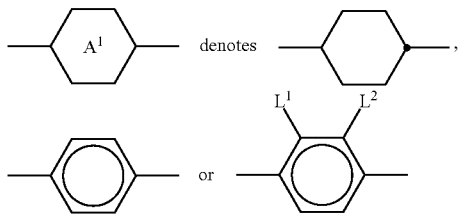

a1 denotes 0 or 1,
$L^1$ and $L^2$ each, independently of one another, denote H, F or Cl,
$R^1$ on each occurrence, identically or differently, denotes —$(CH_2)_m$—CH=CH—$C_nH_{2n+1}$,
$R^2$ denotes alkyl having 1 to 12 C atoms, in which one or two non-adjacent $CH_2$ groups may be replaced by —O—, —CH=CH—, —CO—, —OCO— or —COO— in such a way that O atoms are not linked directly to one another, or, if a1=0 and the ring $A^1$ denotes cyclohexylene, $R^2$ also denotes $R^1$,
m on each occurrence, identically or differently, denotes 0, 1, 2, 3, 4 or 5, and,
n on each occurrence, identically or differently, denotes 1, 2, 3, 4, 5 or 6, where n+m≤6.

2. A liquid-crystal display according to claim 1, wherein the one or more polymerisable compounds are of formula I or II $R^a$-$A^1$-$(Z^1$-$A^2)_{m1}$-$R^b$     I $(R^*$-$(A^1Z^1)_{m1})_k$-Q     II in which
$R^a$ and $R^b$ each, independently of one another, denote P-Sp-, H, L, or straight-chain or branched alkyl having 1 to 25 C atoms, in which one or more non-adjacent $CH_2$ groups are optionally replaced, independently of one another, by —$C(R^x)$=$C(R^x)$—, —C≡C—, —$N(R^x)$—, —O—, —S—, —CO—, —CO—O—, —O—CO—, —O—CO—O— in such a way that O and/or S atoms are not linked directly to one another, and in which one or more H atoms are optionally replaced by F, Cl, Br, I, CN or P-Sp-, where at least one of the radicals $R^a$ and $R^b$ denotes P-Sp-, $R^x$ denotes P-Sp-, H, halogen, straight-chain, branched or cyclic alkyl having 1 to 25 C atoms, in which one or more non-adjacent $CH_2$ groups are optionally replaced by —O—, —S—, —CO—, —CO—O—, —O—CO—, —O—CO—O— in such a way that O and/or S atoms are not linked directly to one another, and in which one or more H atoms are optionally replaced by F, Cl or P-Sp-, an optionally substituted aryl or aryloxy group having 6 to 40 C atoms, or an optionally substituted heteroaryl or heteroaryloxy group having 2 to 40 C atoms, P on each occurrence, identically or differently, denotes a polymerisable group, Sp on each occurrence, identically or differently, denotes a spacer group or a single bond, $A^1$ and $A^2$ each, independently of one another, denotes an aromatic, heteroaromatic, alicyclic or heterocyclic group which may contain fused rings, and which is optionally mono- or polysubstituted by L, $Z^1$ on each occurrence, identically or differently, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, $CR^0R^{00}$ or a single bond, L denotes P-Sp-, H, OH, $CH_2OH$, halogen, $SF_5$, $NO_2$, a carbon group or hydrocarbon group, $R^0$ and $R^{00}$ each, independently of one another, denote H or alkyl having 1 to 12 C atoms, m1 denotes 0, 1, 2, 3 or 4,
n1 denotes 1, 2, 3 or 4,
$R^*$ denotes P-Sp-, H, halogen, $SF_5$, $NO_2$, a carbon group or hydrocarbon group,
Q denotes a k-valent chiral group, which is optionally mono- or polysubstituted by L, and
k denotes 1, 2, 3, 4, 5 or 6.

3. A liquid-crystal display according to claim 1 wherein the one or more compounds of the formula A are one or more compounds of the following formulae:

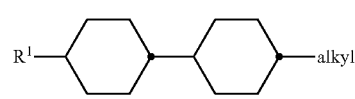

Aa

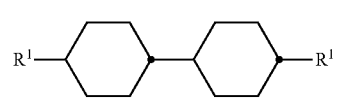

Ab

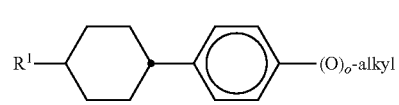

Ac

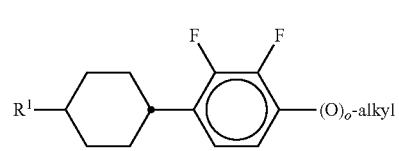

Ad

-continued

Ae
R¹—[cyclohexane]—[cyclohexane]—[benzene]—(O)ₒ-alkyl

Af
R¹—[cyclohexane]—[cyclohexane]—[benzene with F,F]—(O)ₒ-alkyl

Ag
R¹—[cyclohexane]—[benzene]—[benzene]—(O)ₒ-alkyl

Ah
R¹—[cyclohexane]—[benzene]—[benzene with F,F]—(O)ₒ-alkyl

Ai
R¹—[cyclohexane]—[benzene with F,F]—[benzene with F,F]—(O)ₒ-alkyl

Ak
R¹—[cyclohexane]—[cyclohexane]—[benzene with F]—(O)ₒ-alkyl in which R¹ denotes —(CH$_2$)$_m$—CH=CH—C$_n$H$_{2n+1}$, o is 0 or 1, and "alkyl" denotes C$_{1-6}$-alkyl.

4. A liquid-crystal display according to claim 1, wherein the liquid-crystal medium comprises one or more compounds of the following formulae:

CY
R¹—[H]$_a$—Z$^x$—[benzene with L¹,L²]—R²

PY
R¹—[H]—Z$^y$$_b$—[B]—Z$^x$—[benzene with L³,L⁴]—R² in which
a denotes 1 or 2,
b denotes 0 or 1,

[B] denotes

[cyclohexane]

denotes

[benzene] or [benzene with L³, L⁴]

R¹ and R² each, independently of one another, denote alkyl having 1 to 12 C atoms, in which one or two non-adjacent CH$_2$ groups may be replaced by —O—, —CH=CH—, —CO—, —OCO— or —COO— in such a way that O atoms are not linked directly to one another, Z$^x$ and Z$^y$ each, independently of one another, denote —CH$_2$CH$_2$—, —CH=CH—, —OCF$_2$—, —CH$_2$O—, —OCH$_2$—, —COO—, —C$_2$F$_4$—, —CF=CF—, —CH=CHCH$_2$O— or a single bond, and L$^{1-4}$ each, independently of one another, denote F, Cl, OCF$_3$, CF$_3$, CH$_3$, CH$_2$F, or CHF$_2$.

5. A liquid-crystal display according to claim 1, wherein the liquid-crystal medium comprises one or more compounds of the following formula:

ZK
R³—[C]—Z$^y$—[D]—R⁴ in which

[C]

denotes

[H], [tetrahydropyran], [tetrahydropyran variant], [cyclohexene] or [D]

denotes

[H] or [benzene],

R³ and R⁴ each, independently of one another, denote alkyl having 1 to 12 C atoms, in which one or two non-adjacent CH₂ groups may be replaced by —O—, —CH=CH—, —CO—, —OCO— or —COO— in such a way that O atoms are not linked directly to one another, and Z^y denotes —CH₂CH₂—, —CH=CH—, —CF₂O—, —OCF₂—, —CH₂O—, —OCH₂—, —COO—, —OCO—, —C₂F₄—, —CF=CF—, —CH=CHCH₂— or a single bond.

6. A liquid-crystal display according to claim 1, wherein the Liquid-crystal medium, apart from the polymerisable compounds of the formula I or II, comprises no compounds which contain a terminal vinyl or vinyloxy group.

7. A liquid-crystal display according to claim 1, which is a PSA-VA, PSA-OCB, PS-IPS, PS-FFS or PS-TN display.

8. A liquid-crystal medium comprising:
a liquid-crystalline component A) comprising one or more compounds of the formula A, and
a polymerisable component B) comprising one or more polymerisable compounds,

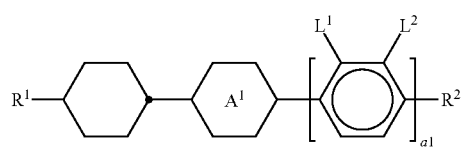   A in which

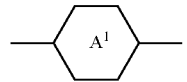

denotes

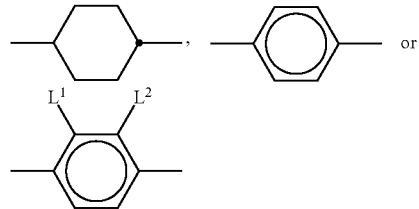   or a1 denotes 0 or 1,
L¹ and L² each, independently of one another, denote H, F or Cl,
R¹ on each occurrence, identically or differently, denotes —(CH₂)_m—CH=CH—C_nH_{2n+1},
R² denotes alkyl having 1 to 12 C atoms, in which one or two non-adjacent CH₂ groups may be replaced by —O—, —CH=CH—, —CO—, —OCO— or —COO— in such a way that O atoms are not linked directly to one another, or, if a1 =0 and the ring A¹ denotes cyclohexylene, R² also denotes R¹,
m on each occurrence, identically or differently, denotes 0, 1, 2, 3, 4 or 5, and,
n on each occurrence, identically or differently, denotes 1, 2, 3, 4, 5 or 6, where n+m≤6.

9. A liquid-crystal medium according to claim 8, which comprises one or more compounds of

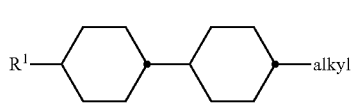   Aa

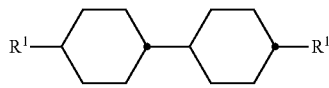   Ab

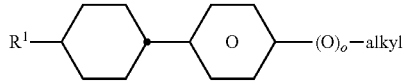   Ac

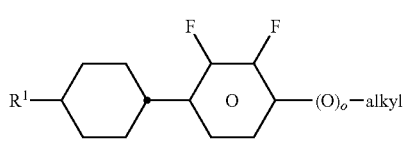   Ad

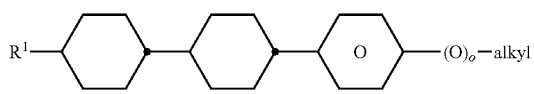   Ae

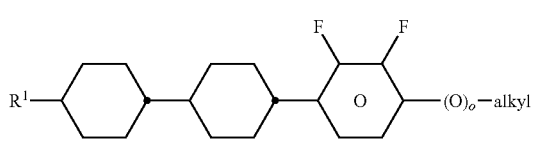   Af

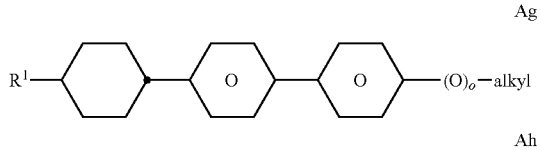   Ag

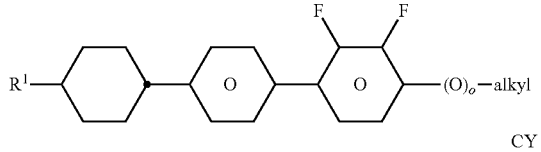   Ah

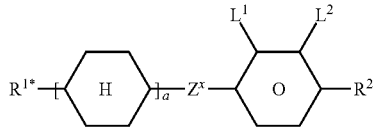   CY

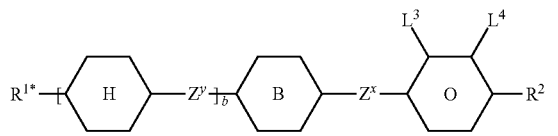   PY

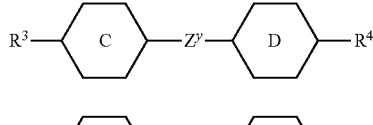   ZK

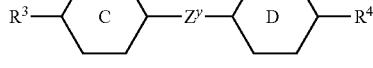   ZK $$R^a\text{-}A^1\text{-}(Z^1\text{-}A^2)_{m1}\text{-}R^b \qquad \text{formula I,}$$

or $$(R^*\text{-}(A^1\text{-}Z^1)_{m1})_k\text{-}Q \qquad \text{formula II}$$

in which
a denotes 1 or 2,
b denotes 0 or 1,

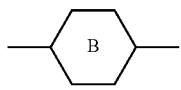

denotes

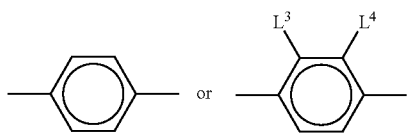

denotes

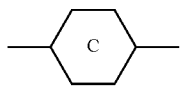

denotes

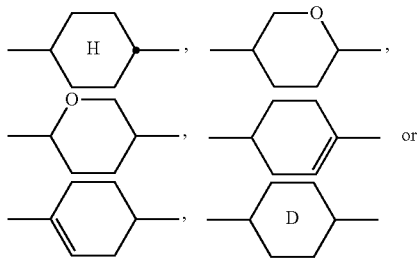

denotes

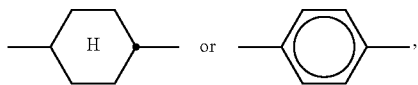

$R^1$ denotes $(CH_2)_m$, —CH=CH—$C_nH_{2n+1}$,
o is 0 or 1,
alkyl denotes $C_{1-6}$-alkyl,
$R^1{}^*$ and $R^2$ each, independently of one another, denote alkyl having 1 to 12 C atoms, in which one or two non-adjacent $CH_2$ groups may be replaced by —O—, —CH=CH—, —CO—, —OCO— or —COO— in such a way that O atoms are not linked directly to one another,
$R^3$ and $R^4$ each, independently of one another, denote alkyl having 1 to 12 C atoms, in which one or two non-adjacent $CH_2$ groups may be replaced by —O—, —CH=CH—, —CO—, —OCO— or —COO— in such a way that O atoms are not linked directly to one another,
$Z^x$ and $Z^y$ each, independently of one another, denote —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —CH=CHCH$_2$O— or a single bond, and
$L^{1-4}$ each, independently of one another, denote F, Cl, $OCF_3$, $CF_3$, $CH_3$, $CH_2F$, or $CHF_2$,
$R^a$ and $R^b$ each, independently of one another, denote P-Sp-, H, L, or straight-chain or branched alkyl having 1 to 25 C atoms, in which one or more non-adjacent $CH_2$ groups are optionally replaced, independently of one another, by —$C(R^x)$=$C(R^x)$—, —C≡C—, —$N(R^x)$—, —O—, —S—, —CO—, —CO—O—, —O—CO—, —O—CO—O— in such a way that O and/or S atoms are not linked directly to one another, and in which one or more H atoms are optionally replaced by F, Cl, Br, I, CN or P-Sp-, where at least one of the radicals $R^a$ and $R^b$ denotes P-Sp-,
$R^x$ denotes P-Sp-, H, halogen, straight-chain, branched or cyclic alkyl having 1 to 25 C atoms, in which one or more non-adjacent $CH_2$ groups are optionally replaced by —O—, —S—, —CO—, —CO—O—, —O—CO—, —O—CO—O— in such a way that O and/or S atoms are not linked directly to one another, and in which one or more H atoms are optionally replaced by F, Cl or P-Sp-, an optionally substituted aryl or aryloxy group having 6 to 40 C atoms, or an optionally substituted heteroaryl or heteroaryloxy group having 2 to 40 C atoms,
P on each occurrence, identically or differently, denotes a polymerisable group,
Sp on each occurrence, identically or differently, denotes a spacer group or a single bond,
$A^1$ and $A^2$ each, independently of one another, denotes an aromatic, heteroaromatic, alicyclic or heterocyclic group which may contain fused rings, and which is optionally mono- or polysubstituted by L,
$Z^1$ on each occurrence, identically or differently, denotes —O—, —S—, —CO—, —CO—O—, —OCO—, —O—CO—O—, —$OCH_2$—, —$CH_2O$—, —$SCH_2$—, —$CH_2S$—, —$OCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, $CR^oR^{oo}$ or a single bond,
L denotes P-Sp-, H, OH, $CH_2OH$, halogen, $SF_5$, $NO_2$, a carbon group or hydrocarbon group,
$R^o$ and $R^{oo}$ each, independently of one another, denote H or alkyl having 1 to 12 C atoms,
m1 denotes 0, 1, 2, 3 or 4,
n1 denotes 1, 2, 3 or 4,
$R^*$ denotes P-Sp-, H, halogen, $SF_5$, $NO_2$, a carbon group or hydrocarbon group,
Q denotes a k-valent chiral group, which is optionally mono- or polysubstituted by L,
k denotes 1, 2, 3, 4, 5 or 6.

10. A process for the preparation of a liquid-crystal medium according to claim 8 comprising mixing one or more compounds of formula A with one or more polymerisable compounds of formula I or II $$R^a\text{-}A^1\text{-}(Z^1\text{-}A^2)_{m1}\text{-}R^b \qquad \text{I}$$

$$(R^*\text{-}(A^1\text{-}Z^1)_{m1})_k\text{-}Q \qquad \text{II}$$

in which $R^a$ and $R^b$ each, independently of one another, denote P-Sp-, H, L, or straight-chain or branched alkyl having 1 to 25 C atoms, in which one or more non-adjacent $CH_2$ groups are optionally replaced, independently of one another, by —$C(R^x)$=$C(R^x)$—, —C≡C—, —$N(R^x)$—, —O—, —S—, —CO—, —CO—O—, —O—CO—, —O—CO—O— in such a way that O and/or S atoms are not linked directly to one another, and in which one or more H atoms are optionally replaced by F, Cl, Br, I, CN or P-Sp-, where at least one of the radicals $R^a$ and $R^b$ denotes P-Sp-, $R^x$ denotes P-Sp-, H, halogen, straight-chain, branched or cyclic alkyl having 1 to 25 C atoms, in which one or more non-adjacent $CH_2$ groups are optionally replaced by —O—, —S—, —CO—, —CO—O—, —O—CO—, —O—CO—O— in such a way that O and/or S atoms are not linked directly to one another, and in which one or more H atoms are optionally replaced by F, Cl or P-Sp-, an optionally substituted aryl or aryloxy group having 6 to 40 C atoms, or an optionally substituted heteroaryl or heteroaryloxy group having 2 to 40 C atoms, P on each occurrence, identically or differently, denotes a polymerisable group, Sp on each occurrence, identically or differently, denotes a spacer group or a single bond, $A^1$ and $A^2$ each, independently of one another, denote an aromatic, heteroaromatic, alicyclic or heterocyclic group, which may contain fused rings, and which is optionally mono- or polysubstituted by L, $Z^1$ on each occurrence, identically or differently, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, $CR^0R^{00}$ or a single bond, L denotes P-Sp-, H, OH, $CH_2OH$, halogen, $SF_5$, $NO_2$, a carbon group or hydrocarbon group, $R^0$ and $R^{00}$ each, independently of one another, denote H or alkyl having 1 to 12 C atoms, m1 denotes 0, 1, 2, 3 or 4, n1 denotes 1, 2, 3 or 4, R* denotes P-Sp-, H, halogen, $SF_5$, $NO_2$, a carbon group or hydrocarbon group, Q denotes a k-valent chiral group, which is optionally mono- or polysubstituted by L, and k denotes 1, 2, 3, 4, 5 or 6, and optionally with further liquid-crystalline compounds and/or additives.

11. A liquid-crystal medium according to claim 8, wherein the polymerisable component B) comprises one or more polymerisable compounds of formula I or II

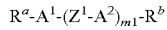    I

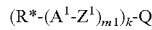    II in which $R^a$ and $R^b$ each, independently of one another, denote P-Sp-, H, L, or straight-chain or branched alkyl having 1 to 25 C atoms, in which one or more non-adjacent $CH_2$ groups are optionally replaced, independently of one another, by —$C(R^x)$=$C(R^x)$—, —CC—, —$N(R^x)$—, —O—, —S—, —CO—, —CO—O—, —O—CO—, —O—CO—O— in such a way that O and/or S atoms are not linked directly to one another, and in which one or more H atoms are optionally replaced by F, Cl, Br, I, CN or P-Sp-, where at least one of the radicals $R^a$ and $R^b$ denotes P-Sp-, $R^x$ denotes P-Sp-, H, halogen, straight-chain, branched or cyclic alkyl having 1 to 25 C atoms, in which one or more non-adjacent $CH_2$ groups are optionally replaced by —O—, —S—, —CO—, —OCO—, —O—CO—, —O—OCO—O— in such a way that O and/or S atoms are not linked directly to one another, and in which one or more H atoms are optionally replaced by F, Cl or P-Sp-, an optionally substituted aryl or aryloxy group having 6 to 40 C atoms, or an optionally substituted heteroaryl or heteroaryloxy group having 2 to 40 C atoms, P on each occurrence, identically or differently, denotes a polymerisable group, Sp on each occurrence, identically or differently, denotes a spacer group or a single bond, $A^1$ and $A^2$ each, independently of one another, denote an aromatic, heteroaromatic, alicyclic or heterocyclic group, which may contain fused rings, and which is optionally mono- or polysubstituted by L, $Z^1$ on each occurrence, identically or differently, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCOO—CH=CH—, $CR^0R^{00}$ or a single bond, L denotes P-Sp-, H, OH, $CH_2OH$, halogen, $SF_5$, $NO_2$, a carbon group or hydrocarbon group, $R^0$ and $R^{00}$ each, independently of one another, denote H or alkyl having 1 to 12 C atoms, m1 denotes 0, 1, 2, 3 or 4, n1 denotes 1, 2, 3 or 4, R* denotes P-Sp-, H, halogen, $SF_5$, $NO_2$, a carbon group or hydrocarbon group, Q denotes a k-valent chiral group, which is optionally mono- or polysubstituted by L, and k denotes 1, 2, 3, 4, 5 or 6.

12. A liquid-crystal display according to claim 2, wherein R* denotes P-Sp-, H, L, or straight-chain or branched alkyl having 1 to 25 C atoms, in which one or more non-adjacent $CH_2$ groups are optionally replaced, independently of one another, by —$C(R^x)$=$C(R^x)$—, —C≡C—, —$N(R^x)$—, —O—, —S—, —CO—, —CO—O—, —O—CO—, —O—CO—O— in such a way that O and/or S atoms are not linked directly to one another, and in which one or more H atoms are optionally replaced by F, Cl, Br, I, CN or P-Sp-, and L denotes P-Sp-, OH, $CH_2OH$, F, Cl, Br, I, —CN, —$NO_2$, —NCO, —NCS, —OCN, —SCN, —C(=O)$N(R^x)_2$, —C(=O)$Y^1$, —C(=O)$R^x$, —$N(R^x)_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which one or more H atoms are optionally replaced by F, Cl or P-Sp-.

13. A liquid-crystal display according to claim 9, wherein R* denotes P-Sp-, H, L, or straight-chain or branched alkyl having 1 to 25 C atoms, in which one or more non-adjacent $CH_2$ groups are optionally replaced, independently of one another, by —$C(R^x)$=$C(R^x)$—, —CC—, —$N(R^x)$—, —O—, —S—, —CO—, —CO—O—, —O—CO—, —O—CO—O— in such a way that O and/or S atoms are not linked directly to one another, and in which one or more H atoms are optionally replaced by F, Cl, Br, I, CN or P-Sp-, and L denotes P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which one or more H atoms are optionally replaced by F, Cl or P-Sp-.

14. A liquid-crystal display according to claim 10, wherein R* denotes P-Sp-, H, L, or straight-chain or branched alkyl having 1 to 25 C atoms, in which one or more non-adjacent CH$_2$ groups are optionally replaced, independently of one another, by —C(R$^x$)=C(R$^x$)—, —CC—, —N(R$^x$)—, —O—, —S—, —CO—, —CO—O—, —O—CO—, —O—CO—O— in such a way that O and/or S atoms are not linked directly to one another, and in which one or more H atoms are optionally replaced by F, Cl, Br, I, CN or P-Sp-, and L denotes P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which one or more H atoms are optionally replaced by F, Cl or P-Sp-.

15. A liquid-crystal display according to claim 11, wherein R* denotes P-Sp-, H, L, or straight-chain or branched alkyl having 1 to 25 C atoms, in which one or more non-adjacent CH$_2$ groups are optionally replaced, independently of one another, by —C(R$^x$)=C(R$^x$)—, —CC—, —N(R$^x$)—, —O—, —S—, —CO—, —CO—O—, —O—CO—, —O—CO—O— in such a way that O and/or S atoms are not linked directly to one another, and in which one or more H atoms are optionally replaced by F, Cl, Br, I, CN or P-Sp-, and L denotes P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which one or more H atoms are optionally replaced by F, Cl or P-Sp-.

\* \* \* \* \*